United States Patent
Sieler et al.

(10) Patent No.: US 8,794,770 B2
(45) Date of Patent: Aug. 5, 2014

(54) PROJECTION DISPLAY AND METHOD OF DISPLAYING AN OVERALL PICTURE

(75) Inventors: Marcel Sieler, Jena (DE); Peter Schreiber, Jena (DE); Erik Foerster, Jena (DE)

(73) Assignee: Fraunhofer-Gesellschaft zur Foerderung der angewandten Forschung e.V., Munich (DE)

( * ) Notice: Subject to any disclaimer, the term of this patent is extended or adjusted under 35 U.S.C. 154(b) by 275 days.

(21) Appl. No.: 13/051,157

(22) Filed: Mar. 18, 2011

(65) Prior Publication Data

US 2011/0304825 A1 Dec. 15, 2011

(30) Foreign Application Priority Data

Jun. 15, 2010 (DE) .......................... 10 2010 030 138

(51) Int. Cl.
- *G03B 21/20* (2006.01)
- *G03B 21/00* (2006.01)
- *G03B 21/26* (2006.01)
- *G02B 3/08* (2006.01)
- *G02B 9/00* (2006.01)

(52) U.S. Cl.
USPC .............. 353/102; 353/33; 353/34; 359/741; 359/797

(58) Field of Classification Search
USPC ..................... 353/30, 31, 32, 33, 38, 102, 34; 359/618, 649–651, 786, 741, 796, 797, 359/676
See application file for complete search history.

(56) References Cited

U.S. PATENT DOCUMENTS

| | | | |
|---|---|---|---|
| 4,969,734 A | * | 11/1990 | Kahn et al. .................... 353/122 |
| 6,583,938 B1 | | 6/2003 | Woodgate et al. |
| 2004/0017148 A1 | | 1/2004 | Redecker |
| 2004/0233342 A1 | | 11/2004 | Kim et al. |
| 2005/0083696 A1 | | 4/2005 | Chiang et al. |
| 2005/0254018 A1 | * | 11/2005 | Magarill et al. ................ 353/94 |

(Continued)

FOREIGN PATENT DOCUMENTS

| | | |
|---|---|---|
| DE | 10 2006 004 301 A1 | 8/2007 |
| DE | 10 2006 035 601 A1 | 1/2008 |

(Continued)

OTHER PUBLICATIONS

Official Communication issued in corresponding Japanese Patent Application No. 2011-065300, mailed on Nov. 27, 2012.

(Continued)

*Primary Examiner* — William C Dowling
*Assistant Examiner* — Ryan Howard
(74) *Attorney, Agent, or Firm* — Keating & Bennett, LLP

(57) ABSTRACT

A projection display includes at least one light source, at least one reflective image generator configured to represent frames in a two-dimensional distribution of subareas of same, a projection optics arrangement having a two-dimensional arrangement of optical projection elements and being configured to image an associated subarea of the at least one image generator onto an image plane in each case, so that images of the frames superimpose within the image plane to form an overall picture, and at least one beam splitter arranged within an optical path between the at least one reflective image generator and the two-dimensional arrangement of optical projection elements, on the one hand, and the optical path between the at least one light source and the at least one reflective image generator, on the other hand.

32 Claims, 16 Drawing Sheets

(56) References Cited

U.S. PATENT DOCUMENTS

| | | |
|---|---|---|
| 2006/0025032 A1 | 2/2006 | Erdos et al. |
| 2006/0139577 A1 | 6/2006 | Ikeda et al. |
| 2007/0046896 A1 | 3/2007 | Ko et al. |
| 2007/0052934 A1 | 3/2007 | Widdowson et al. |
| 2008/0013052 A1* | 1/2008 | Van Gorkom et al. .......... 353/38 |
| 2009/0086296 A1 | 4/2009 | Renaud-Goud |
| 2009/0141242 A1 | 6/2009 | Silverstein et al. |
| 2009/0237616 A1 | 9/2009 | Aizaki |
| 2009/0257117 A1 | 10/2009 | Baba |
| 2009/0268166 A1 | 10/2009 | Chen et al. |
| 2009/0303443 A1 | 12/2009 | Wächter |
| 2009/0323028 A1 | 12/2009 | Shanley |

FOREIGN PATENT DOCUMENTS

| | | |
|---|---|---|
| DE | 10 2009 024 894 A1 | 12/2010 |
| EP | 0 676 902 A2 | 10/1995 |
| EP | 1 385 338 A1 | 1/2004 |
| EP | 1 389 018 A2 | 2/2004 |
| JP | 08-286146 A | 11/1996 |
| JP | 2004-138881 A | 5/2004 |
| JP | 2006-178349 A | 7/2006 |
| JP | 2008-122641 A | 5/2008 |
| JP | 2008-541150 A | 11/2008 |
| JP | 2009-251457 A | 10/2009 |
| JP | 2009-251458 A | 10/2009 |
| TW | 200931159 A | 7/2009 |
| TW | 200944835 A | 11/2009 |
| WO | 2006/118882 A2 | 11/2006 |

OTHER PUBLICATIONS

Official Communication issued in International Patent Application No. PCT//EP2011/059618, mailed on Aug. 19, 2011.

Official Communication issued in corresponding Korean Patent Application No. 10-2011-0026572, mailed on Aug. 9, 2012.

Official Communication issued in corresponding Taiwanese Patent Application No. 100119559, mailed on Oct. 3, 2013.

* cited by examiner (REFLECTIVE IMAGE GENERATOR IN TWO DIFFERENT MODES)

(METHOD OF DISPLAYING AN OVERALL PICTURE)

PROJECTION DISPLAY AND METHOD OF DISPLAYING AN OVERALL PICTURE

Embodiments of the invention relate to a projection display and to a method of displaying an overall picture. Further embodiments of the invention relate to a projection device based on a reflective liquid-crystal image generator and utilization of same.

BACKGROUND OF THE INVENTION

Projection of dynamic picture content onto a screen, or as a virtual picture, using a digital, reflective liquid-crystal-based image generator is based, in accordance with conventional technology, on projection devices having an imaging optical channel, or three channels, whose optical paths unite upstream from the optical projection element in order to realize the color mixture.

In particular, US 2009 323 028 A1 shows picoprojectors that are LED-illuminated in a color-sequential manner. In addition, US 2009 237 616 A1 describes a projection display comprising three color channels combined upstream from the optical projection element.

However, if one reduces the dimensions of the systems known in conventional technology in order to realize miniaturized picoprojectors, brightness losses of the projected picture will result, in particular. Miniaturization of known projection systems is possible only to a limited extent due to the transmissible luminous flux being limited by the small surface area of the image generator existing in said systems. This connection is determined by the basic optical law of étendue maintenance. The étendue, or light conductance, of a light source $$E = 4\pi n^2 A \sin \Theta$$

results from its luminous surface area A, the half-angle of divergence $\Theta$, and the relative refractive index n, and remains constant in the case of ideal optical imaging. Real optical elements increase the étendue and/or decrease the system transmission. Thus, a minimum object surface area may be used for a source having a given level of luminance for a minimally transmissible luminous flux within a projecting optical system.

A general problem is that due to optical laws (e.g. natural vignetting, abberations), for single-channel projection systems the design length of the system increases to the same extent as this area that is to be imaged increases, which makes miniaturization more difficult.

SUMMARY

According to an embodiment, a projection display may have: at least one light source, at least one reflective image generator configured to represent frames in a two-dimensional distribution of subareas of same, a projection optics arrangement having a two-dimensional arrangement of optical projection elements and being configured to image an associated subarea of the at least one image generator onto an image plane in each case, so that images of the frames superimpose within the image plane to form an overall picture, and at least one beam splitter arranged within an optical path between the at least one reflective image generator and the two-dimensional arrangement of optical projection elements, on the one hand, and within the optical path between the at least one light source and the at least one reflective image generator, on the other hand.

According to another embodiment, a method of displaying an overall picture, may have the steps of: providing of light using at least one light source; representing frames in a two-dimensional distribution of subareas using at least one reflective image generator; imaging a subarea of the image generator onto an image plane by a projection optics arrangement having a two-dimensional arrangement of optical projection elements, said subarea being associated with the optical projection elements in each case, so that images of the frames superimpose within the image plane to form an overall picture, a beam splitter being arranged within an optical path between the at least one reflective image generator and the two-dimensional arrangement of optical projection elements, on the one hand, and the optical path between the light source and the at least one reflective image generator, on the other hand.

Embodiments of the present invention provide a projection display comprising a light source, a reflective image generator configured to represent frames in a two-dimensional distribution of subareas of same, a projection optics arrangement having a two-dimensional arrangement of optical projection elements and being configured to image an associated subarea of the image generator onto an image plane in each case, so that images of the frames superimpose within the image plane to form an overall picture, and a beam splitter arranged within an optical path between the reflective image generator and the two-dimensional arrangement of optical projection elements, on the one hand, and within the optical path between the light source and the reflective image generator, on the other hand.

It is the core idea of the present invention that the above-mentioned shorter system design length may be achieved while simultaneously achieving increased brightness when frames are represented in a two-dimensional distribution of subareas using a reflective image generator, and a subarea of the image generator is imaged onto an image plane by a projection optics arrangement having a two-dimensional arrangement of optical projection elements, said subarea being associated with the optical projection elements in each case, so that images of the frames superimpose one another within the image plane to form an overall picture, a beam splitter being arranged in an optical path between the reflective image generator and the two-dimensional arrangement of optical projection elements, on the one hand, and in the optical path between the light source and the reflective image generator, on the other hand. In this manner, the above-mentioned miniaturization may be facilitated, which enables realization of very flat and, at the same time, very bright projection systems.

In further embodiments of the present invention, the optical projection elements of the projection display may have a decentration with regard to the associated subareas of the image generator, so that the overall picture superimposing within the image plane is real or virtual. By means of the decentration, or central contraction or dilation between the optical projection elements and the associated subareas of the image generator, a projection distance of the overall picture may be adjusted within the image plane, in particular.

In further embodiments of the present invention, the projection optics arrangement may further comprise an overall lens connected downstream from the two-dimensional arrangement of optical projection elements and cooperating with the two-dimensional arrangement of optical projection elements, said overall lens being configured to refocus collimated beams from the optical projection elements, so that the image plane of the overall picture is located within a focal plane of the overall lens.

In further embodiments of the present invention, the downstream overall lens may be configured as optics having a variable focal length, so that a projection distance may be adjustable.

In particular, the optics comprising variable focal length may be a zoom objective or a fluid lens. By employing such optics, different projection distances may be adjusted with, at the same time, reduced vignetting of beams that are distant from the axis.

In further embodiments of the present invention, the optical projection elements may be centered with regard to the associated subareas and may have a collimating effect.

In further embodiments of the present invention, a two-dimensional arrangement of field lenses associated with the optical projection elements may be arranged at least in one optical path between the reflective image generator and the beam splitter. As a result, in particular a Köhler illumination of each optical projection element of the two-dimensional arrangement of optical projection elements may be achieved.

Further embodiments of the present invention provide a method of displaying an overall picture, comprising providing of light using a light source, representing individual areas in a two-dimensional distribution of subareas using a reflective image generator, and imaging a subarea of the image generator onto an image plane by a projection optics arrangement having a two-dimensional arrangement of optical projection elements, said subarea being associated with the optical projection elements in each case, so that images of the frames superimpose within the image plane to form an overall picture, a beam splitter being arranged in a beam splitter between the reflective image generator and the two-dimensional arrangement of optical projection elements, on the one hand, and within the optical path between the light source and the reflective image generator, on the other hand.

BRIEF DESCRIPTION OF THE DRAWINGS

Embodiments of the present invention will be detailed subsequently referring to the appended drawings, in which.

DETAILED DESCRIPTION OF THE INVENTION

Figure 1:
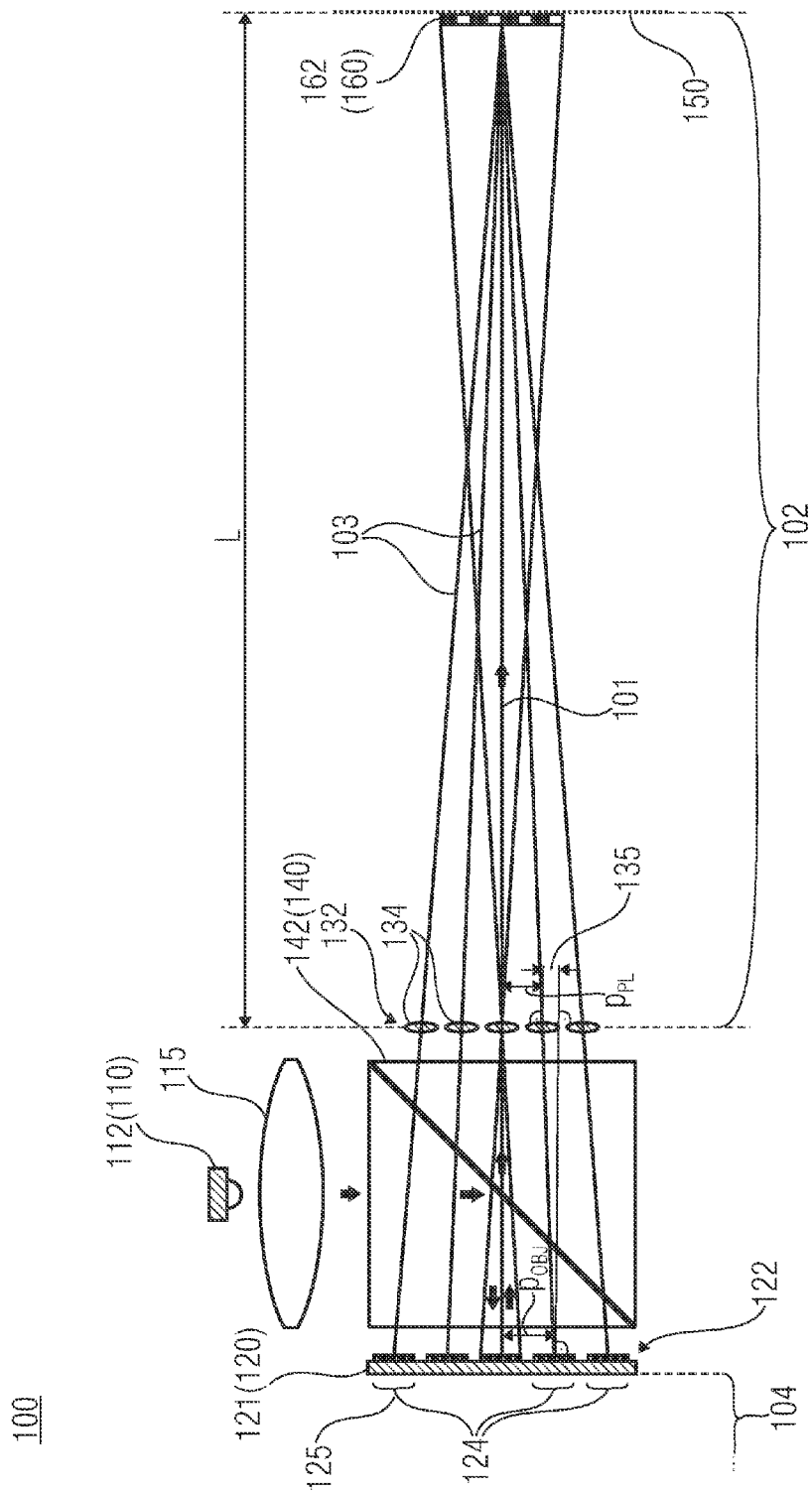
FIG. 1 shows a side view of a projection display in accordance with an embodiment of the present invention.

Before the present invention will be explained in more detail in the following with reference to the figures, it shall be noted that in the embodiments presented below, elements that are identical or identical in function are provided with identical reference numerals in the figures. Descriptions of elements bearing the same reference numerals are therefore mutually exchangeable and/or mutually applicable in the various embodiments.

FIG. 1 shows a side view of a projection display 100 in accordance with an embodiment of the present invention. The projection display 100 shown in FIG. 1 comprises a light source 110, a reflective image generator 120, a two-dimensional arrangement 132 of optical projection elements 134 and a beam splitter 140. In this context, the reflective image generator 120 is configured to represent frames in a two-dimensional distribution 122 of its subareas 124. In addition, the two-dimensional arrangement 132 of optical projection elements 134 is configured to image an associated subarea 125 of the image generator 120 onto an image plane 150 in each case, so that images of the frames superimpose within the image plane 150 to form an overall picture 160. Finally, the beam splitter 140 is arranged in an optical path between the reflective image generator 120 and the two-dimensional arrangement 132 of optical projection elements, on the one hand, and in the optical path between the light source 110 and the reflective image generator 120, on the other hand.

In particular, in further embodiments, the beam splitter 140 may have a polarizing action, and the reflective image generator 120 may be configured to represent the frames in the form of an influence exerted on the polarization.

In further embodiments of the invention of FIG. 1, the projection display consists, in particular, of a regular, two-dimensional arrangement of image-generating areas on the reflective image generator 120 configured, for example, as a liquid-crystal image generator 121, a beam splitter 140 configured, for example, as a polarizing beam splitter 142, and the two-dimensional arrangement 132 of optical projection elements 134. As is shown in FIG. 1, light of the light source 110 configured as an LED 112, for example, initially passes through condenser optics 115 and is then directed onto the polarizing beam splitter 142. From there, it will finally be reflected, in a polarized state, in the direction of the reflective image generator 120, which is an LCoS (liquid crystal on silicon) image generator, for example.

Depending on the gray-scale value of the picture element to be represented, the image generator—which is digital, for example—rotates the polarization direction of the light reflected off it, and thus controls transmission during the second pass through the polarizing beam splitter. The fast pixel-by-pixel switching of the voltages, or crystal rotations, enables representing dynamic picture contents.

The optical projection elements 134 shown in FIG. 1 may be microlenses, for example, configured—in a regular two-dimensional arrangement—as projection objectives which image a subarea 125 of the image generator 120 onto the imaging plane 150 and/or onto a screen in each case. Utilization of such a projection optics arrangement enables drastically reducing the design length of the overall system as compared to conventional single-channel projectors of the same picture size. While a small design length of the inventive projection display or projection system results from focal lengths of the optical projection elements or lenses of a few millimeters, whose focal lengths in turn depend on the dimensions of the beam splitter, multiplication of the object areas or lateral extension ensures a proportional increase in the picture brightness. As compared to miniaturized single-channel projectors, one thus obtains an design length that exceeds the thickness of the beam splitter by only a few millimeters with comparable lateral extension and projection distances.

In further embodiments of the invention, the projection picture may arise due to superposition, joining or interleaving the images of single channels of the arrangement.

In further embodiments, as is shown in FIG. 1 by way of example, the optical projection elements 134 have a decentration 135 with regard to the associated subareas 124.

Generally, the decentration may be considered to be a central contraction or dilation with regard to a central optical axis 101, or to be a lateral offset of the optical projection elements 134 with regard to the associated subareas 124 of the image generator 120. The decentration of the optical projection elements with regard to the associated frames onto the image generator is decisive for the projection distance, or projection pitch. On account of a large depth of focus of the partial pictures, it is only to a limited extent that said projection distance depends on the focusing of the individual optical projection elements.

Due to a slightly reduced center-to-center distance (pitch) of the optical projection elements and/or projection lenses with regard to the image-generating structures, an offset 135 of the respective image-generating structure and the corresponding optical projection element arises, said offset 135 increasing toward the outside from the central optical axis 101 of the two-dimensional arrangement 132 of optical projection elements 134, or from the array center (grid center). The resulting slight tilting of the optical axes 103 of external optical projection elements 134, or projectors, in relation to the central optical axis 101, or the central channel, ensures superposition of individual images within the image plane 150 to form the overall picture 160. In this context, the image plane may be in infinity or may be located at a finite distance from the optical projection element upstream from the image generator or downstream from the image generator. As is shown in FIG. 1, the area upstream from the image generator is defined by the area 102 on the right-hand side of, or in, the optical path downstream from the two-dimensional arrangement 132 of optical projection elements 134, whereas the area downstream from the image generator is defined by the area 104 on the left-hand side of the left of the image generator 120, or on that side of the image generator 120 that faces away from the beam splitter 140. The individual images may superimpose, e.g on a screen, to form the overall picture.

No further macroscopic optical elements for projection within the optical path are necessitated. The projection distance, or projection spacing, L of the array projection display (i.e. the distance L of the image plane 150 from the two-dimensional arrangement 132 of optical projection elements 134 perpendicular to it) results from the focal length of the optical projection element f, the center-to-center distance of the optical projection elements $p_{PL}$ and the center-to-center distance of the pictures $p_{OBJ}$. The magnification M of the images results from the relationship between the projection distance L and the focal length of the projection lens f. The following relationships apply:

$$L = \frac{f \cdot p_{PL}}{p_{OBJ} - p_{PL}}$$

$$M = \frac{L}{f} = \frac{p_{PL}}{p_{OBJ} - p_{PL}}.$$

The ratio of the center-to-center distances of object structures from optical projection elements, or the difference between them, thus controls the projection spacing.

If the center-to-center distance of the optical projection elements is smaller than that of the image-generating structures, a real picture will result at a defined distance. In the case shown in FIG. 1, the center-to-center distance $p_{PL}$ of the optical projection elements 134 is smaller than the center-to-center distance $p_{OBJ}$ of the associated subareas 124. Thus, in the embodiment of FIG. 1, an overall picture 162 superimposing within the image plane 150 is real.

Figure 2:
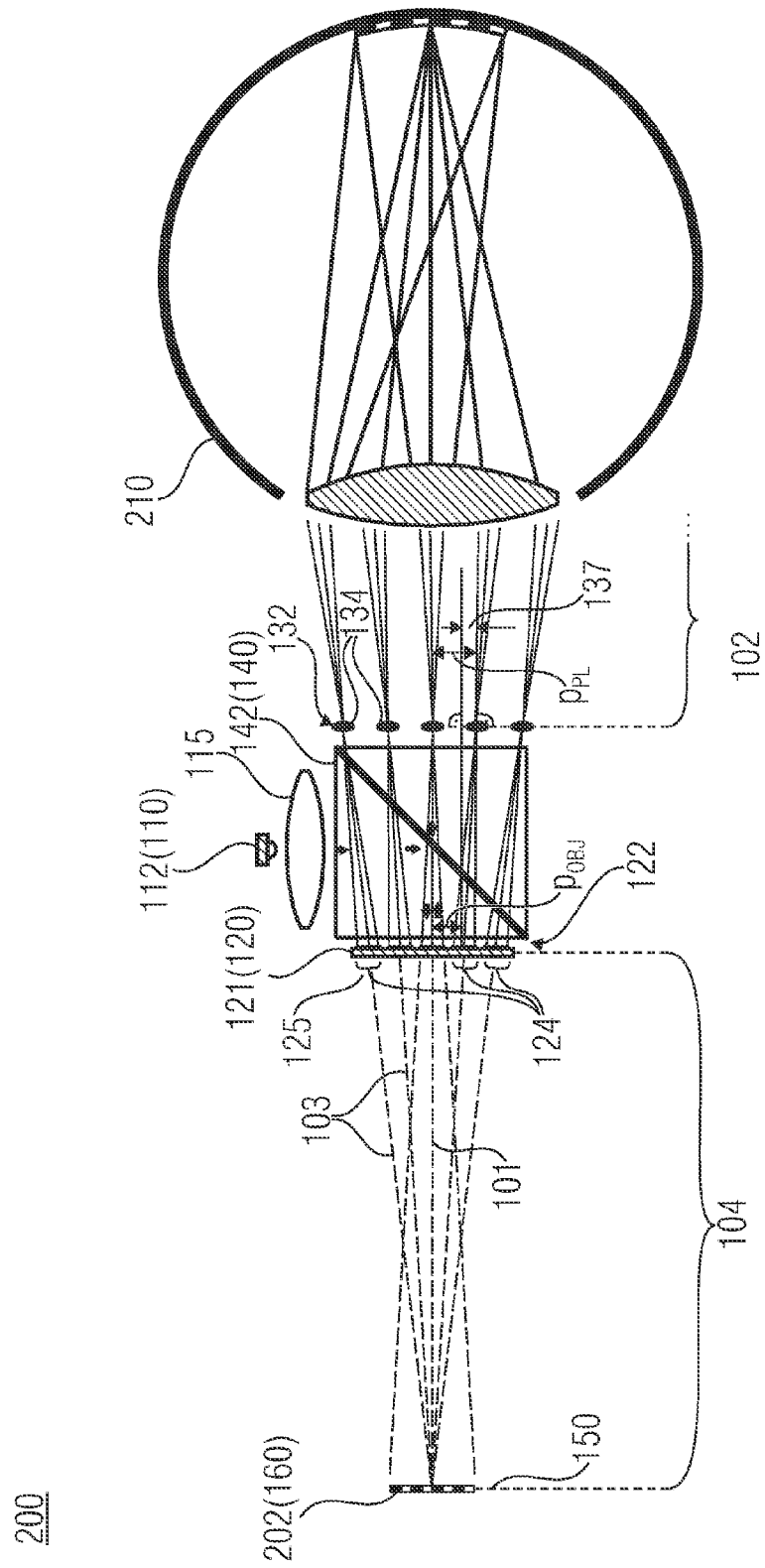
FIG. 2 shows a side view of a projection display in accordance with another embodiment of the present invention.

FIG. 2 shows a side view of a projection display 200 in accordance with a further embodiment of the present invention. As is shown in FIG. 2, the optical projection elements 134 of the projection display 200 have a decentration 137 with regard to the associated subareas 124. In the case shown in FIG. 2, the center-to-center distance $p_{PL}$ of the optical projection elements 134 is larger than the center-to-center distance $p_{OBJ}$ of the associated subareas 124. Therefore, in FIG. 2, an overall picture 202 superimposing within the image plane 150 is virtual. Accordingly, the pitch of the optical projection elements is selected to be larger than that of the partial pictures, the individual optical projection elements being focused such that virtual partial pictures are formed, whereby a virtual overall picture 202 is obtained which is viewed by the observer or eye 210 in transmitted light, as is shown by way of example in FIG. 2.

Figure 3:
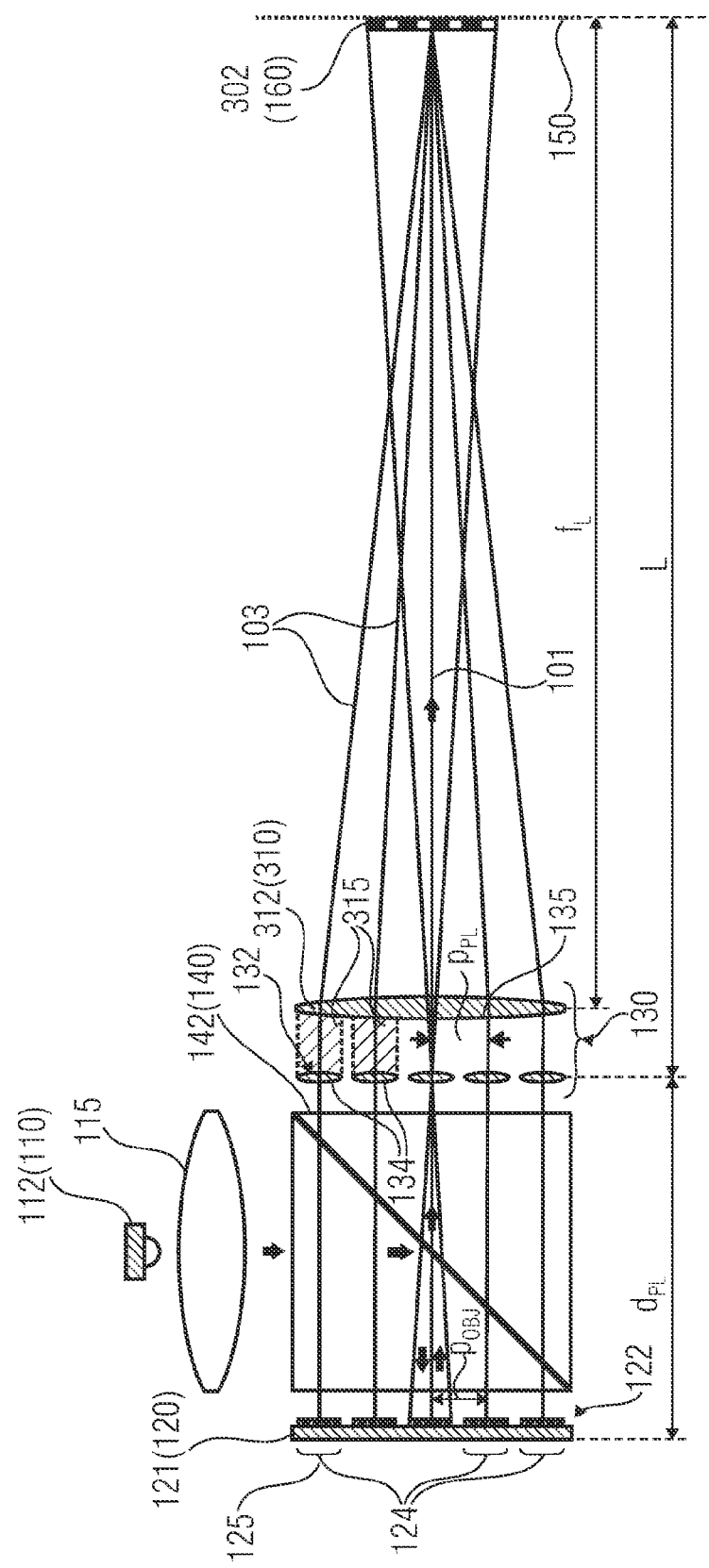
FIG. 3 shows a side view of a projection display in accordance with another embodiment of the present invention.

FIG. 3 shows a side view of a projection display in accordance with a further embodiment of the present invention. In the embodiment shown in FIG. 3, the projection optics arrangement 130 further has an overall lens 310, which cooperates with the two-dimensional arrangement 132 of optical projection elements 134 and is connected downstream with regard to the two-dimensional arrangement 132 of optical projection elements 134. In this connection, downstream means that the overall lens 310 is arranged, within the optical path, downstream from the two-dimensional arrangement 132 of optical projection elements 134. In FIG. 3, the overall lens 310 is configured, in particular, to refocus the collimated beam 315 from the optical projection elements 134, so that the image plane 150 of an overall picture 302 is located within a focal plane of the overall lens 310. This circumstance is depicted in FIG. 3 such that the image plane 150, where the individual images superimpose to form the overall picture 302, has a distance $f_L$ from the overall lens 310. In addition, the distance $d_{PL}$ of the two-dimensional arrangement 132 of optical projection elements 134 from the reflective image generator 120 may be adjusted, e.g., such that it approximately corresponds to the focal length of the optical projection elements 134.

It can be seen in FIG. 3 that the optical projection elements 134 are centered with regard to the associated subareas 124 and have a collimating effect. This means that, in this embodiment, the center-to-center distance $p_{PL}$ of the optical projection elements 134 is equal to the center-to-center distance $p_{OBJ}$ of the associated subareas 124.

Accordingly, if the architecture is modified, as is shown by way of example in FIG. 3, in that the distance $d_{PL}$ of the optical projection elements from the image generator is adjusted such that the individual pictures arise in infinity, the pitch of the partial pictures corresponds to the pitch of the optical projection elements, and if the overall lens 310 is arranged, e.g., in the form of a converging lens 312 within the optical path downstream from the two-dimensional arrangement of optical projection elements, or of the array optics, the overall picture 302 will develop within the focal plane of the lens 310. When using a converging lens, a real picture is projected onto a screen, whereas a diverging lens creates a virtual picture similarly to the architecture shown in FIG. 2. What is advantageous about the implementation shown in FIG. 3 is a vignetting of projection channels 103 that are remote from the axis, said vignetting being smaller, e.g., as compared to the architecture shown in FIG. 1, and the possibility of adjusting different projection distances by using a variable converging or diverging lens, e.g. in the form of a zoom objective or a fluid lens.

In particular, the downstream overall lens 310 shown in FIG. 3 may thus be configured as optics having variable focal lengths, so that a projection distance is adjustable. One may see in FIG. 3 that the projection distance L is essentially defined by the focal length $f_L$ of the overall lens 310, apart from a longitudinal extension of the projection optics arrangement 130.

Figure 4:
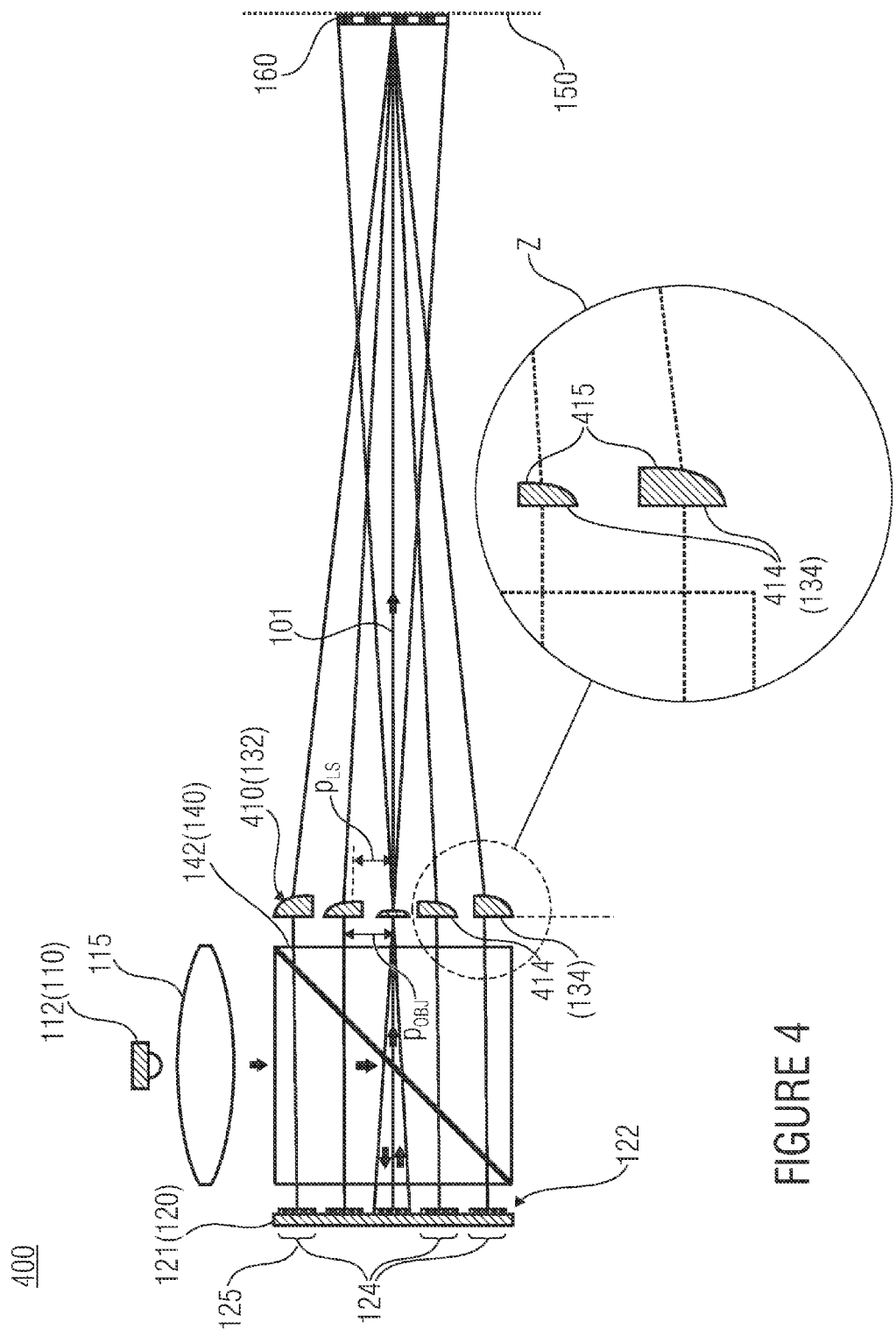
FIG. 4 shows a side view of an inventive projection display comprising a lens vertex that is decentered in relation to the aperture of respective optical projection element in each case.

The optical effect of a downstream converging or diverging lens may also be achieved by a specific implementation of the projection array, as is shown in FIG. 4 by way of example. In particular, FIG. 4 shows a side view of an inventive projection display 400. In the embodiment shown in FIG. 4, the two-dimensional arrangement 132 of optical projection elements 134 is configured as a projection array 410 or as a two-dimensional arrangement, each optical projection element 414 of the projection array 410 comprising a lens vertex 415 decentered toward the aperture of the respective optical projection element.

The optical projection elements 414, shown in FIG. 4, of the two-dimensional arrangement 410 essentially correspond to the optical projection elements 134, shown in FIGS. 1 to 3, of the two-dimensional arrangement 132. In an enlarged representation (circle Z), the individual lens vertices 415 of the optical projection elements 414 may be seen more clearly. The decentration of the lens vertices 415 may be configured, e.g., such that the optical projection elements 414 of the two-dimensional arrangement 410, put together, achieve a same effect as the projection optics arrangement 130, shown in FIG. 3, with the downstream overall lens 310. As is shown by way of example in FIG. 4, in this context a center-to-center distance $p_{LS}$ of the lens vertices 415 is smaller than the center-to-center distance $p_{OBJ}$ of the associated subareas 124. Thus, any lens may cause the frame of the respective subarea 125 to be projected onto the image plane 150. There, the images of the frames will superimpose to form the overall picture 160.

Accordingly, if one uses projection lenses having a lens vertex that is increasingly offset relative to its aperture as the distance from the central optical axis 101, or system axis, increases, the optical function of the overall lens, such as of a converging lens, may be shifted into the projection, or lens, array. What is advantageous about the embodiment shown in FIG. 4 is that an optical component is saved, specifically while maintaining the smaller level of vignetting of channels that are remote from the axis.

Figure 5:
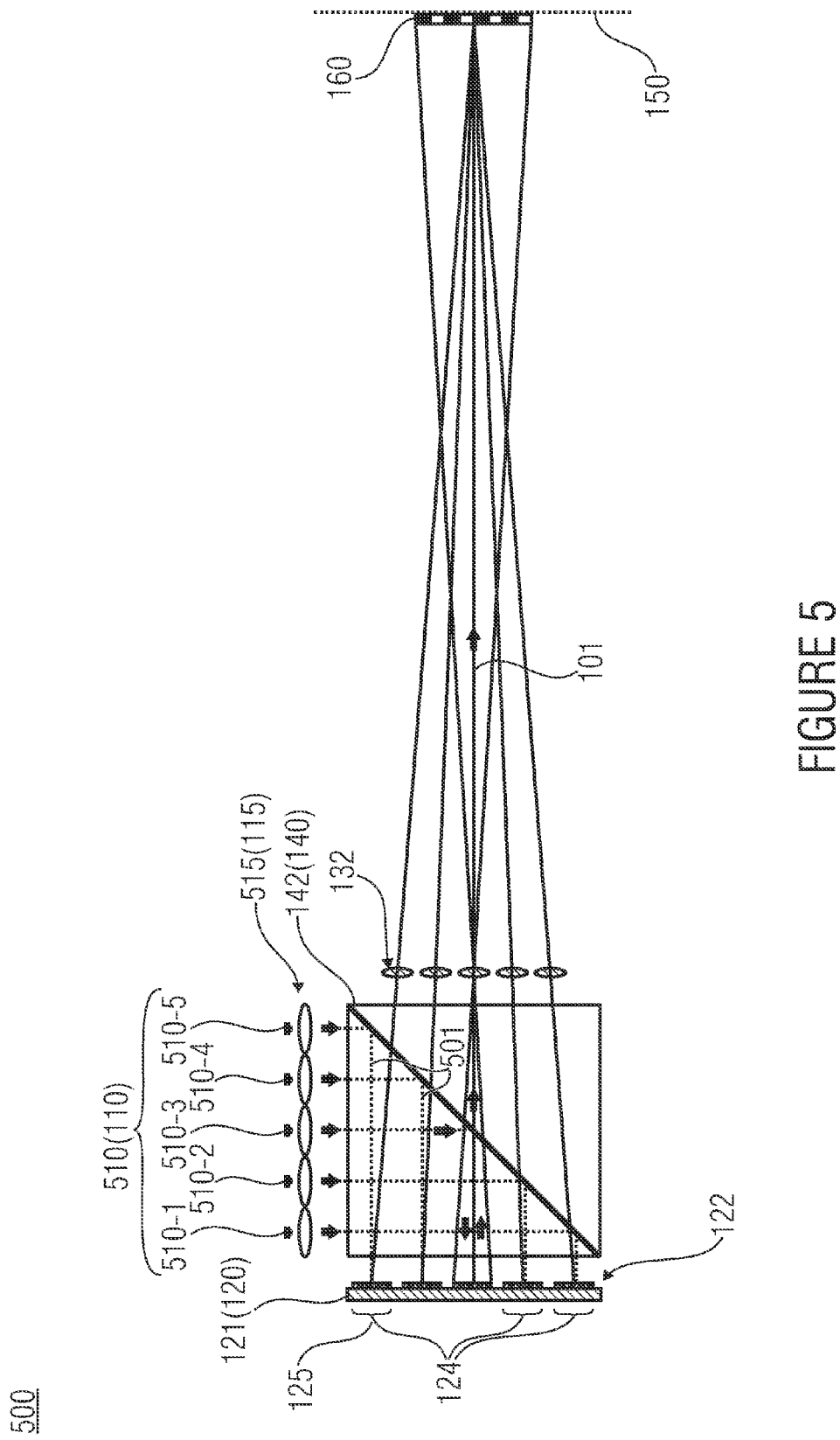
FIG. 5 shows a side view of an inventive projection display having a grid arrangement of light sources.

One advantage of the present invention is the unproblematic utilization of array light sources, shown in FIG. 5. In FIG. 5, an inventive projection display 500 having a grid arrangement 510 of light sources is depicted. In this context, the grid arrangement 510 shown in FIG. 5 essentially corresponds to the light source 110 in FIGS. 1 to 4. In addition, FIG. 5 shows a condenser optics arrangement 515. The condenser optics arrangement 515 of FIG. 5 essentially corresponds to the condenser optics 115 in FIGS. 1 to 4. As is shown in FIG. 5, the grid arrangement 510 comprises a plurality of light sources 510-1, 510-2, . . . , 510-5, each light source having a condenser optics of the condenser optics arrangement 515 associated with it. In particular, the grid arrangement 510 of light sources and the condenser optics arrangement 515 may be configured such that light from the individual light sources 510-1, 510-2, . . . , 510-5 is directed to associated subareas 124 of the image generator 120, respectively, as is depicted in FIG. 5 by illumination paths 501. One advantage of the embodiment shown in FIG. 5 is that, due to the superposition of many frames, as is also the case in the arrangements previously described, usually no particular steps need to be taken in order to homogenize the illumination. A further advantage in the use of array light sources, such as collimated LED arrays, is the resulting smaller increase in the size of the lateral extension of the overall arrangement.

Figure 6:
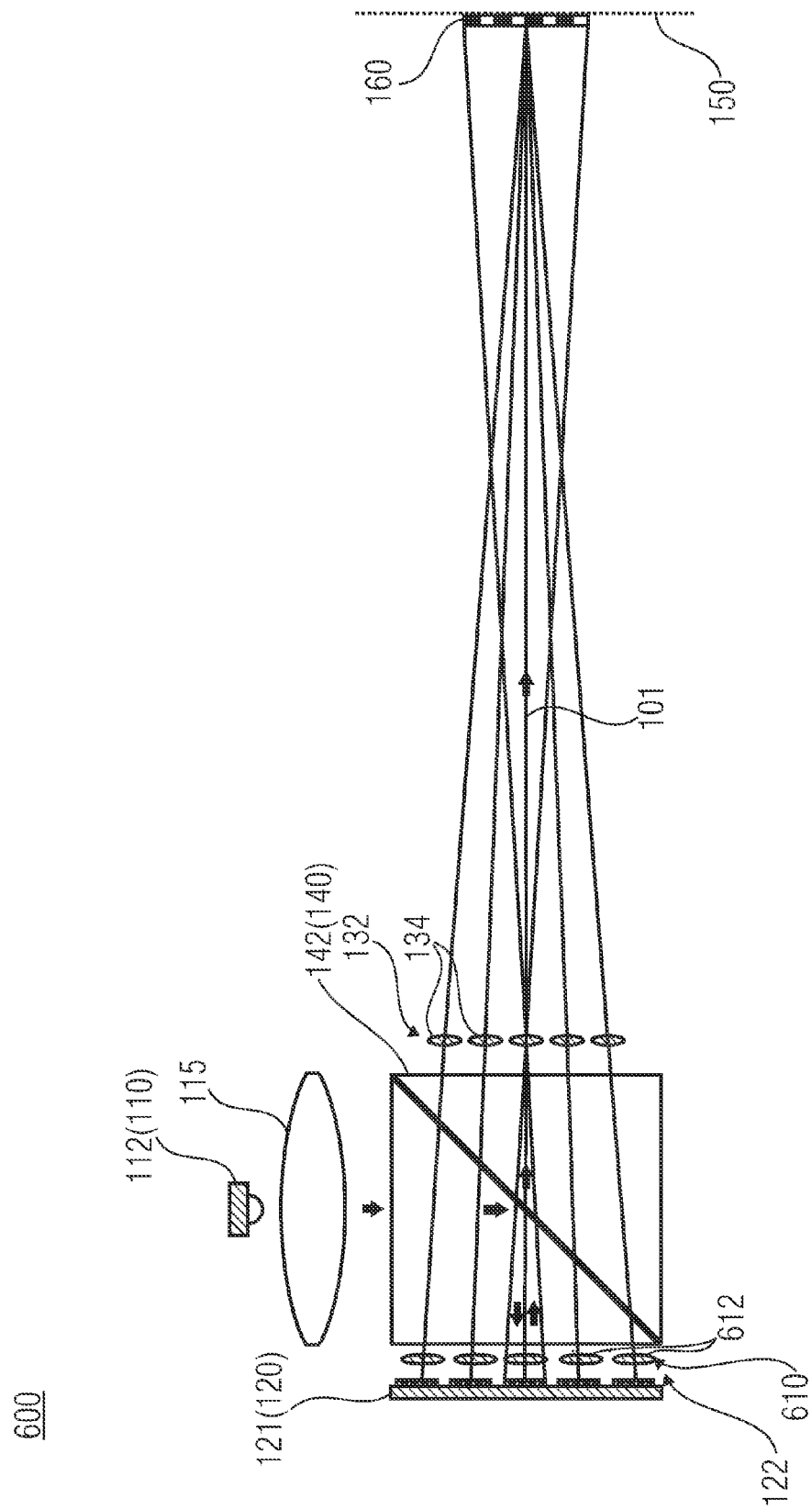
FIG. 6 shows a side view of an inventive projection display having a two-dimensional arrangement of field lenses.

FIG. 6 shows a side view of an inventive projection display 600 comprising a two-dimension arrangement 610 of field lenses 612. In the embodiment shown in FIG. 6, the two-dimensional arrangement 610 of field lenses 612 is arranged at least within an optical path between the reflective image generator 120 and the beam splitter 140. In this context, each field lens 612 in the two-dimensional arrangement 610 is associated with an optical projection element 134 in the two-dimensional arrangement 132 of optical projection elements 134. Due to this utilization of the two-dimensional arrangement 610 of field lenses 612, a Köhler illumination of each optical projection element 134 within the two-dimensional arrangement 132 may be achieved.

In particular, in the projection display 600, a focal length $f_{FL}$ of the field lenses 612 may be between 1.5 and 2.5 times a focal length $f_{PL}$ of the optical projection elements 134.

Put differently, the utilization, shown in FIG. 6, of the two-dimensional arrangement of field lenses, or of a field lens array, between the beam splitter and the image generator enables the Köhler illumination of the optical projection element, whereby the picture brightness may be increased while simultaneously improving suppression of scattered light.

In further embodiments of the invention, the suppression of scattered light may be improved even more in that absorbing diaphragms (not shown in FIG. 6) are used within the plane of the field lens array, said diaphragms covering the areas between the lenses. Generally, utilization of such a diaphragm array between the image generator and the polarizing beam splitter makes sense even without any field lens array for suppressing scattered light.

Figure 7:
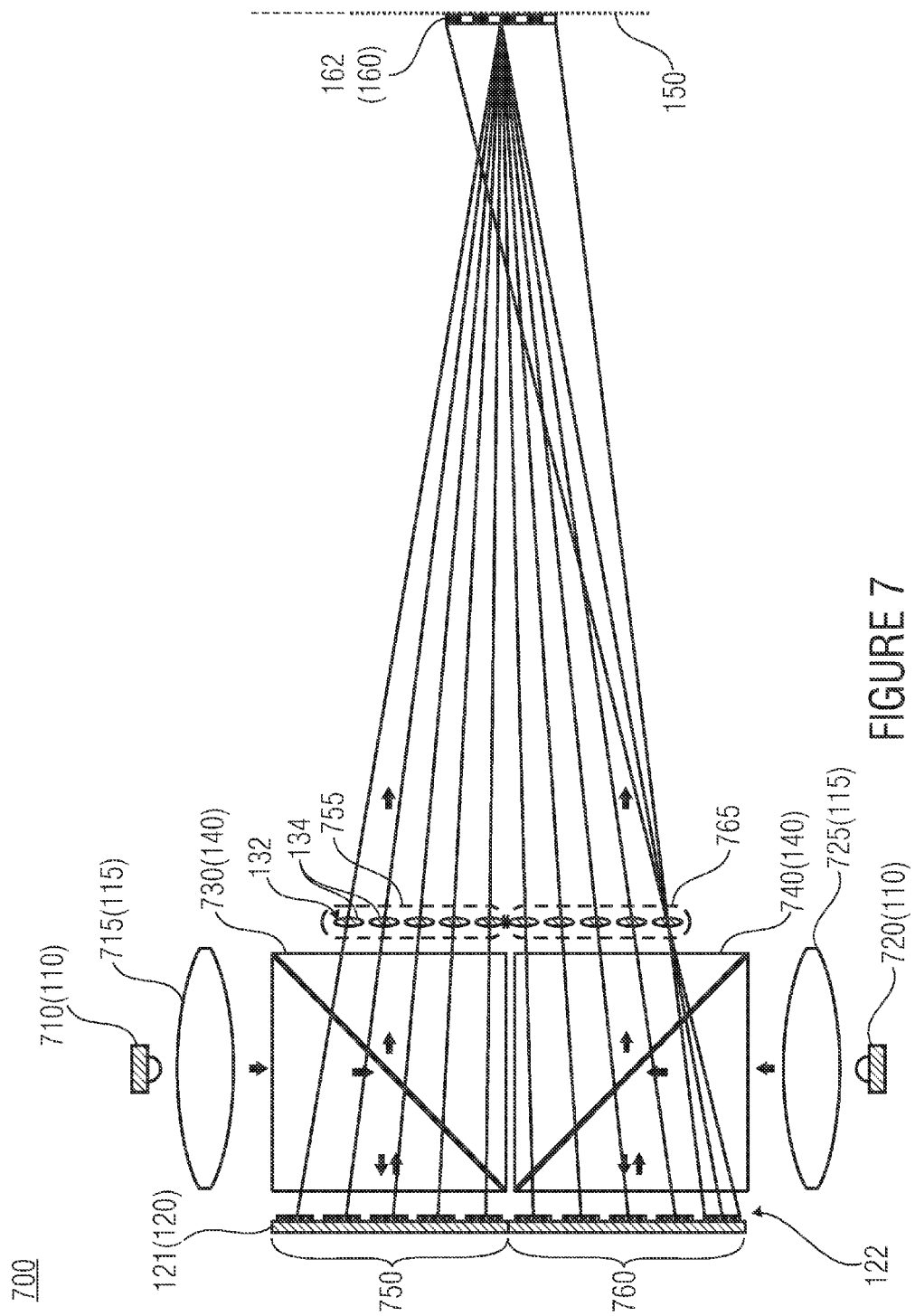
FIG. 7 shows a side view of an inventive projection display having two beam splitters and opposite light sources for two-sided illumination of a reflective image generator.

In further embodiments of the present invention, illumination may also be effected from several sides by means of corresponding, e.g. collimated, light sources. FIG. 7 shows a side view of an inventive projection display 700 comprising two beam splitters 730, 740 and opposite light sources 710, 720 for two-sided illumination of a reflective image generator. In FIG. 7, the projection display 700 comprises, in particular, first and second light sources 710, 720 and first and second beam splitters 730, 740, which are arranged between the reflective image generator 120 and the two-dimensional arrangement 132 of optical projection elements. In this context, the first beam splitter 730 is arranged within the optical path between the first light source 710 and a set 750 of subareas of the reflective image generator 120, and the second beam splitter 740 is arranged within the optical path between the second light source 720 and a second set 760 of subareas of the reflective image generator 120.

As is shown in FIG. 7, a first lateral area 750 of the image generator 120 is illuminated essentially by the first light source 710 and an associated first condenser optics 715, whereas a second lateral area 760 of the image generator 120 is illuminated essentially by the second light source 720 and an associated second condenser optics 725. In this context, the first and second light sources 710, 720 and the associated first and second condenser optics 715 and 725 essentially correspond to the light source 110 and to the condenser optics 115, respectively, of the embodiments described above. In contrast to utilization of a single beam splitter, the two-sided illumination, shown in FIG. 7, comprising two light sources 710, 720 and two polarizing beam splitters 730, 740 enables approximate halving of the design length of the projector.

In further embodiments of the invention, the optical projection elements may also differ from one another in that they are corrected, in terms of distortion, to a larger extent for the respective color spectrum with which the subarea imaged by the respective optical projection element may be illuminated than for any of the other color spectra of the different color spectra.

In further embodiments of the invention, in the two-dimensional arrangement 132 of optical projection elements, the optical projection elements 134 may be corrected in terms of defocusing and/or astigmatism and/or coma that increases as the distance from the optical axis 101 of the image generator 120 and the projection optics arrangement 130 increases.

Finally, in further embodiments, the image generator 120 may be configured such that a size of the subareas 124 continuously changes as the distance from the optical axis 101 of the image generator 120 and the projection optics arrangement 130 increases, so that the frames within the image plane 150 are equally sized.

By means of such a continuous change in the size of the subareas, an object distance that increases as the distance from the central optical axis 101 or from the central channel increases and, thus, a smaller magnification of external optical projection elements 103 with regard to the central channel in the event of a decentration, as is shown by way of example in FIG. 1, may be balanced in the projection of the frames onto the image plane 150.

Figure 8:
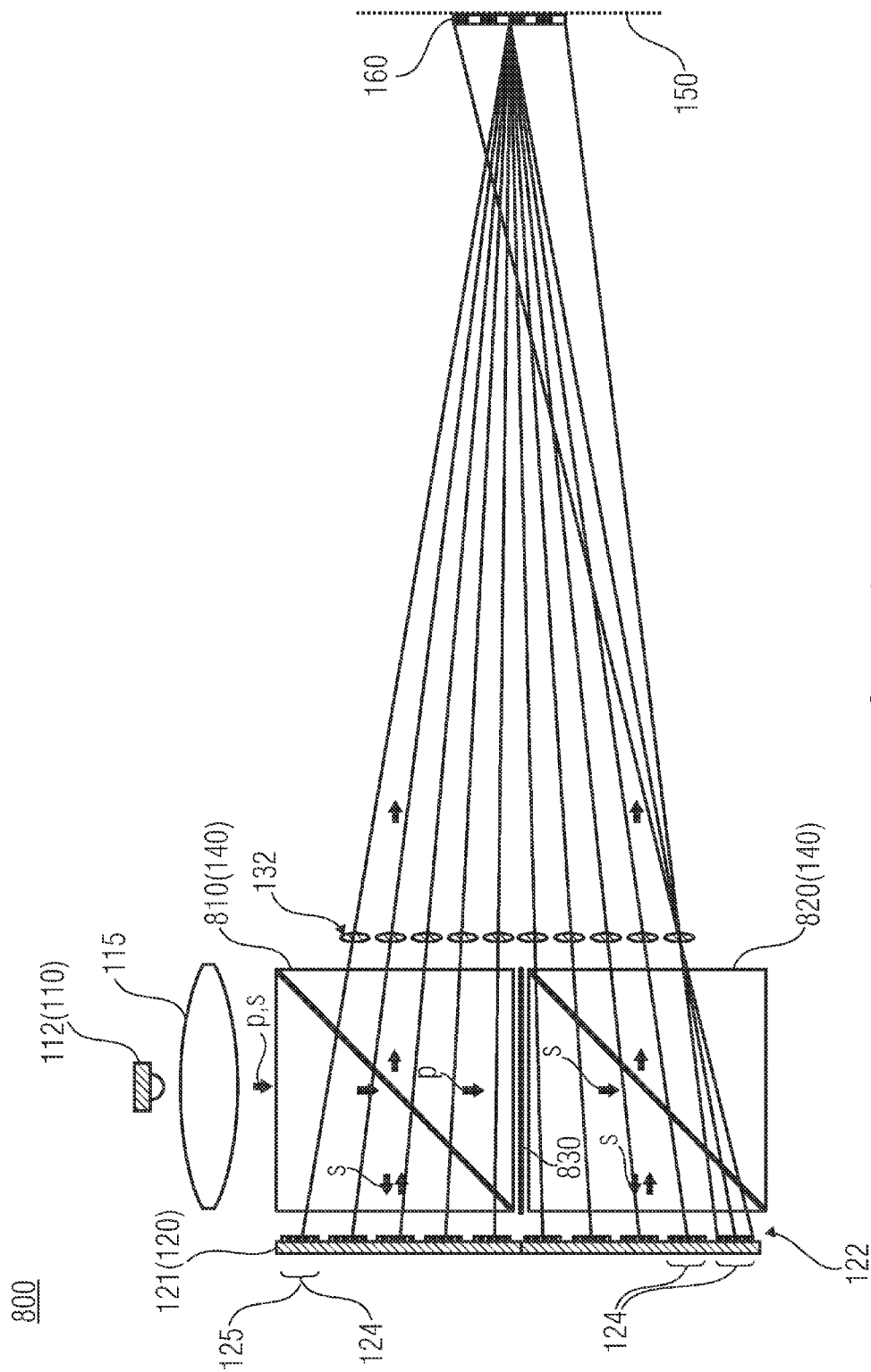
FIG. 8 shows a side view of an inventive projection display having two beam splitters and a half-wave plate interposed in the illumination path.

FIG. 8 shows a side view of an inventive projection display 800 comprising two beam splitters 810, 820 and a half-wave plate 830 that is interposed in the illumination path. Apart from a first beam splitter 810, the projection display 800 of FIG. 8 comprises a second beam splitter 820, in particular, which is arranged within the optical path between the reflective image generator 120 and the two-dimensional arrangement 132 of optical projection elements, on the one hand, and the optical path between the light source 110 and the reflective image generator 120, on the other hand, and a half-wave plate 830 arranged between the first beam splitter 810 and the second beam splitter 820. As a result, a polarization direction of a polarization component (e.g. p), transmitted through the first beam splitter 810, of light emitted by the light source 110 (polarization components p, s) may be rotated by 90° during passing of the half-wave plate 830. In this context, the first beam splitter 810 and the second beam splitter 820 are configured to reflect light, which comes from a direction of the light source 110 and has the polarization direction (e.g. s) that is rotated by 90°, in the direction of the image generator 120. An exemplary illumination path comprising the respective polarization components is depicted in FIG. 8 by the arrows bearing the designations s, p.

In other words, if two polarizing beam splitters are used, as is depicted by way of example in FIG. 8, said beam splitters being connected one behind the other within the illumination light path via the half-wave plate 830, or λ/2 plate, both polarization components (p, s) of an unpolarized light source, such as an LED, may be used. In this context, the half-wave plate rotates the polarization component (p)—which is transmitted through the first beam splitter in an unexploited manner—by 90°, so that it will be reflected in the following beam splitter onto the associated half of the image generator with the proper polarization direction (s).

Full exploitation of an unpolarized light source by the described arrangement having two polarizing beam splitters, or polarizing splitters, and a half-wave plate (λ/2 plate) may be supplemented by the above-described illumination from two sides, which enables further reduction of the design length by half.

With regard to the previous embodiments, projection of outer edges of the first 730, 810 and second beam splitters 740, 820 on the reflective image generator 120 may arise such that it does not pass through the subareas 124 of the image generator 120. In this manner, one may avoid that the outer edges have a disturbing effect in the overall picture when they are projected.

Figure 9:
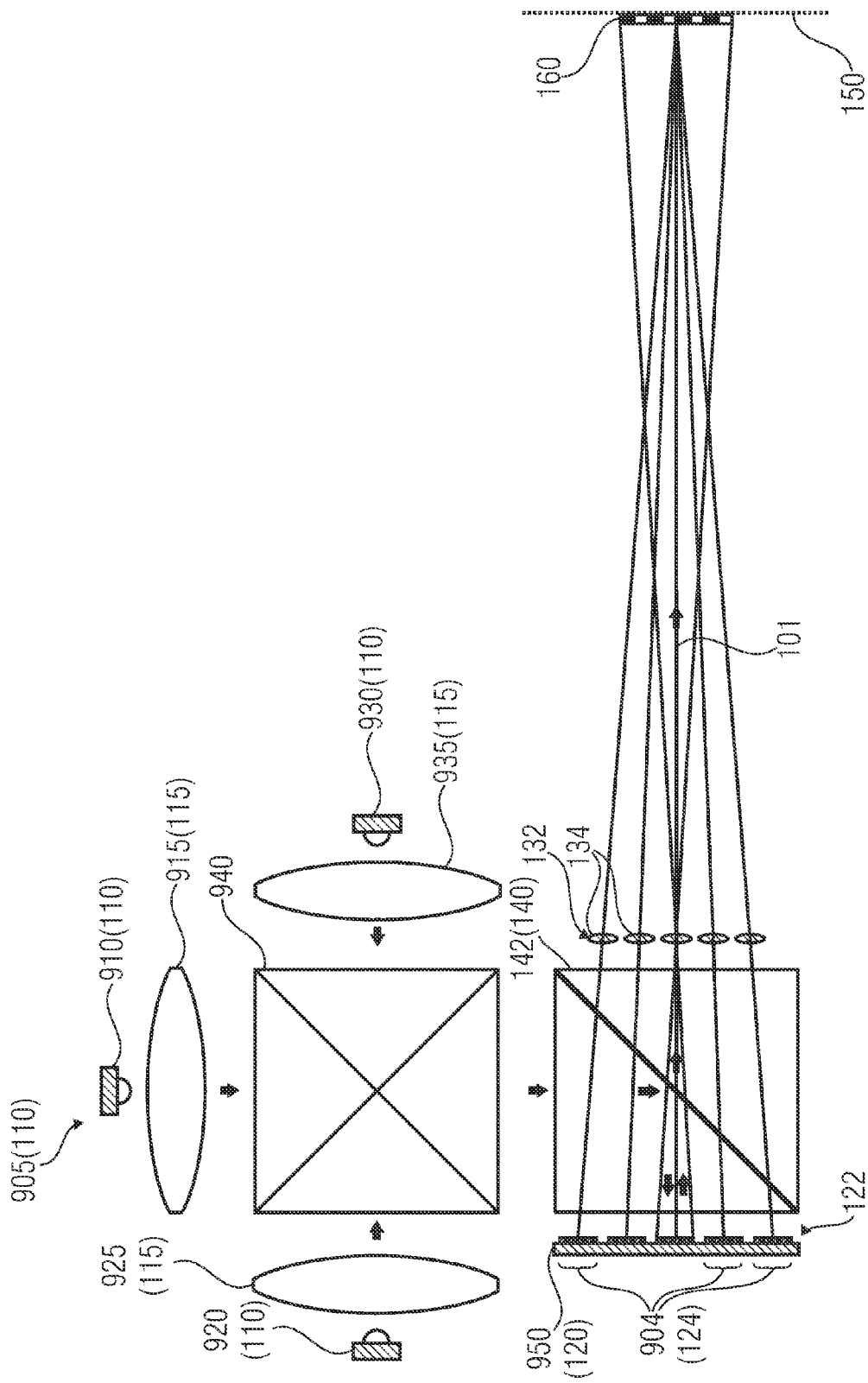
FIG. 9 shows a side view of an inventive projection display having a reflective image generator and an RGB light source synchronized therewith in a color-sequential manner.

In further embodiments of the invention, projection of a full-color RGB picture, as is depicted by way of example in FIG. 9, may be realized by an RGB light source 905. This is possible, e.g., by means of three LEDs 910, 920, 930 comprising associated optical collimation elements 915, 925, 935 and a color combiner 940. In this context, the RGB light source 905 in the embodiment in FIG. 9 essentially corresponds to the light source 110 of the previous embodiments. In particular, in the embodiments shown in FIG. 9, the RGB light source 905 and the image generator 950 operate in a color-sequentially synchronized manner so as to obtain full-color projection.

In FIG. 9, the reflective image generator 950, which essentially corresponds to the image generator 120 of the previous embodiments, may be configured to represent frames 904 from the subareas 124 of the image generator 950 at a sufficiently high frame rate. In this context, the light source 905 may additionally be configured to sequentially pass through different color components (e.g. red, green, blue) per frame. Full-color projection may be realized by means of the color-sequential mode of operation of the image generator 950 and of the individual light sources 910, 920, 930, the picture content of the image generator, which is digital, for example, being identical for all of the projection channels.

In further embodiments of the invention, the light source 110, the beam splitter 140, the projection optics arrangement 130, and the reflective image generator 120 may be configured such that reflected light from at least two subareas of the image generator 120 has an identical color spectrum.

In further embodiments, the light source 110 may additionally be arranged such that different subareas of the image generator 120 are illuminated with different color components. With regard to FIG. 7, for example, the first light source 710 may emit light having a first color component, which light is reflected, once it has passed the condenser optics 715, by the first beam splitter 730 onto the first subarea 750 of the image generator 120, whereas the second light source 720 may emit light having a second color component, which light is reflected, once it has passed the condenser optics 725, by the second beam splitter 740 onto the second subarea 760 of the image generator 120. Thus, different subareas 750, 760 of the image generator 120 may be illuminated with the first and second color components, which may differ from each other.

Figure 10:
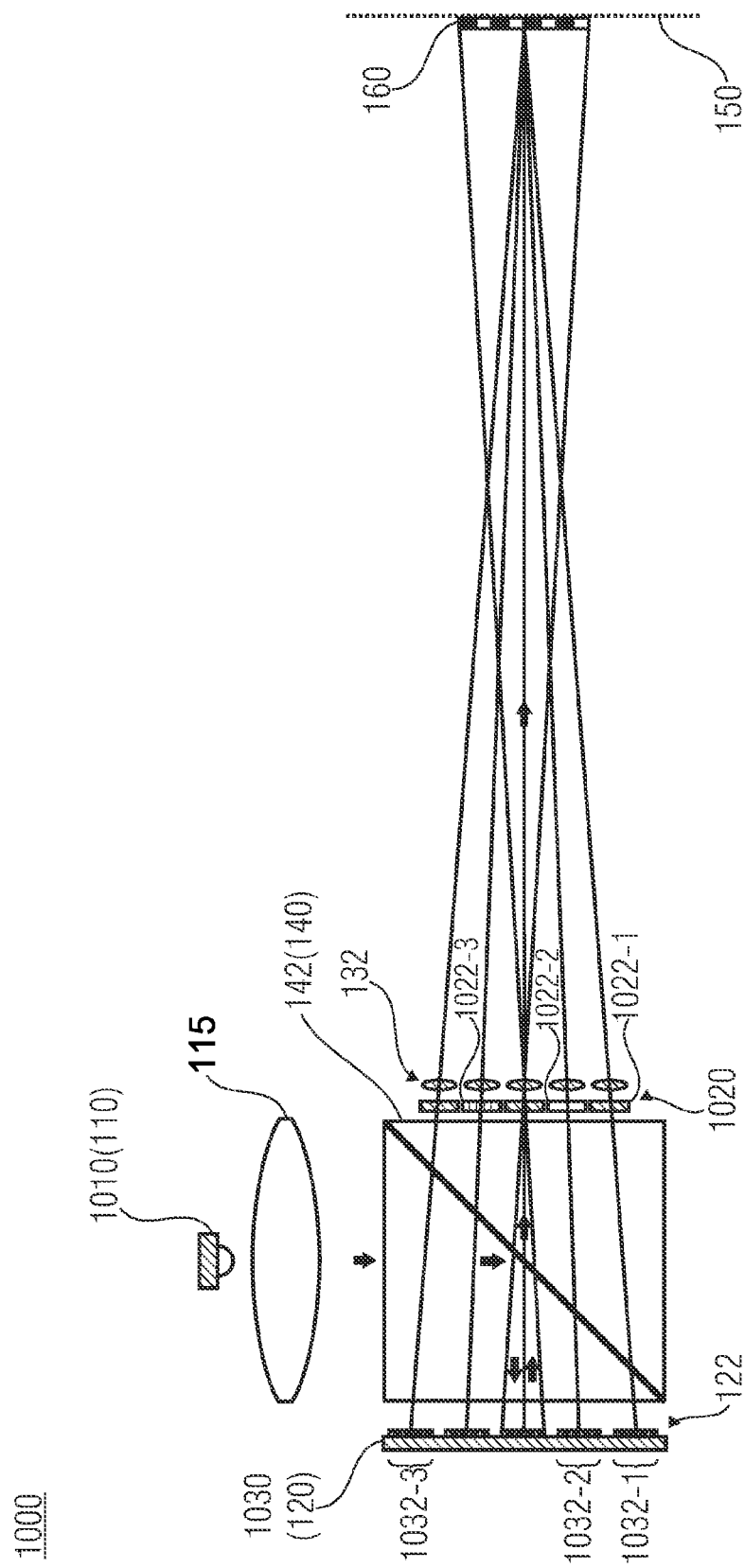
FIG. 10 shows a side view of an inventive projection display having a filter arrangement for producing a color mixture.

FIG. 10 shows a side view of an inventive projection display 1000 comprising a color filter arrangement 1020 for producing a color mixture within the image plane 150. In FIG. 10, the reflective image generator 1030, which essentially corresponds to the reflective image generator 120 of the previous embodiments, is configured to represent groups 1032-1, 1032-2, 1032-3 of frames, each of which represents a gray-scale value of a color component of a picture content. In this context, each group 1032-1, 1032-2, 1032-3 of frames may have a respective color filter 1022-1, 1022-2, 1022-3 of the filter arrangement 1020 associated with it. In this manner, the groups 1032-1, 1032-2, 1032-3 of frames may be filtered in accordance with the respective color component so that the overall picture 160 superimposing within the image plane 150 represents a color mixture.

Put differently, FIG. 10 represents a different possibility of producing RGB pictures. By illumination with a white light source 1010 and by inserting RGB color filters 1022-1, 1022-2, 1022-3 into the imaging light path, one primary-color picture is produced, respectively, within a number of projection channels. Usually, a projection channel corresponds to imaging a subarea of the image generator onto the image plane on the part of an associated optical projection element. An RGB projection thus is achieved by associating the corresponding primary-color picture contents with the respective projection channels. An advantage of this kind of color generation is the possibility of performing a white balance by means of a number of projection channels for the respective primary color, said number of projection channels being adapted to the spectral characteristic of the light source and the color filters.

In further embodiments of the invention, each projecting channel, or a group of optical projection elements, may have a separate light source of a primary color assigned to it/them. The color mixture is effected during superposition to form the overall picture on the screen or within the virtual picture.

With regard to FIG. 7, in the projection system 700, the light source 110 is configured, e.g., in the form of the light sources 710, 720 so as to illuminate, via the beam splitters 730, 740, the different groups 750, 760 of subareas of the image generator 120 with different color spectra. Within the two-dimensional arrangement of optical projection elements, optical projection elements 755, 765 imaging subareas 750, 760, which are illuminated with different color spectra (e.g. red, blue) by the light sources 710, 720, differ from each other.

In further embodiments of the invention, the image generator 120 may also be configured such that a size of subareas 750 that may be illuminated with a first one of the different color spectra (e.g. red), differs from a size of subareas 760 that may be illuminated with a second color spectrum (e.g. blue) differing from the first one. In this manner, sizes of the frames within the image plane may be matched to one another.

In this context it is to be noted that the representation of the color may also be realized—apart from the above-mentioned direct colored illumination of the subareas—by the color filter arrangement shown by way of example in FIG. 10, so that different groups of subareas contribute with different color spectra to the overall picture.

In further embodiments of the invention, a same focal length may be selected for all of the optical projection elements within the two-dimensional arrangement of optical projection elements for all of the different color channels, i.e. for optical channel associated different color spectra, so that an identical magnification results for all of the different color channels. For example, if different geometric distances of the optical projection elements from the reflective image generator are set, different optical path lengths that are due to a dispersion of the beam splitter (e.g. of the first or second beam splitters 730, 740) may be balanced out for the different color channels.

In further embodiments of the invention, however, it may be undesirable to arrange the optical projection elements within the two-dimensional arrangement of optical projection elements at different design heights. Therefore, it may be advantageous to keep the optical projection elements at an identical geometric distance from the reflective image generator. In this case, the different optical path lengths that are due to the dispersion of the beam splitter may be balanced out by selecting different focal lengths of the optical projection elements in accordance with the different optical path lengths for the different color channels. In this context, the different focal lengths result in that different magnifications will result, within the image plane, for the different color channels. The respective magnification, or the respective imaging scale, however, may be readjusted by different sizes of the subareas associated with the different color channels by using a software (i.e. in a computer-controlled manner).

In further embodiments of the invention, the beam splitter may not be configured to be cube-shaped, but as platelets, so that a difference between the different optical path lengths that are due to a relatively small dispersion is negligible.

In further embodiments of the invention, a correction of the longitudinal color defects of the image may thus be anticipated by adapting the focal lengths of the optical projection elements of the primary-color arrays in a color-group-wise manner. In addition, correction of the transverse color defect of the imaging may be anticipated by adapting the partial picture sizes of the primary-color partial pictures in a color-group-wise manner. A further advantage of the present invention thus is the possibility to correct abberations in the form of channel-by-channel correction of chromatic aberrations, such as the longitudinal color defects, of the optical projection elements. If there are different imaging scales for the primary colors, correction of the resulting transverse color defect in the overall picture by means of different picture sizes of the primary-color partial pictures, is also possible, for example.

In further embodiments of the invention, correction of the distortion may be anticipated by a pre-distortion of the partial pictures. In further embodiments, defocusing of projection channels that are remote from the axis may be performed, additionally, by means of a focal length of the optical projection elements that is adapted in a channel-wise manner.

In further embodiments of the invention, an inventive projection display may also be characterized in that the different imaging scales of central channels, or channels that are remote from the axis—said different imaging scales resulting from an adaptation of the focal length—are corrected by a size that is changed channel by channel, and by a pre-distortion of partial pictures that are remote from the axis. In further embodiments, astigmatism and coma may be corrected with different sagittal and tangential focal lengths of optical projection elements that are remote from the axis, said focal lengths being adapted in a channel-wise manner.

Similarly to achromatization, channel-by-channel correction of monochromatic abberations, such as the influence of the image field curvature for relatively large object distances of projection channels that are remote from the axis, or the distortion, along with pre-distortions—which are dependent on the distance of the optical projection element from the axis—of the partial pictures enables simple solutions for improving the picture quality. While, in color correction, one primarily distinguishes between the three color groups, and while three different corrected optical projection elements results therefrom, the correction of monochromatic abberations generally entails the respective optical projection element being adapted in dependence on the position of the respective projection channel in relation to the array center. Here, e.g., lens arrays having focal lengths that continuously vary across the array, for elliptic microlenses also separated into sagittal and meridional focal lengths, are suited for correcting astigmatism and coma.

A further possibility of producing color pictures is to use an array light source, as is shown, e.g., in FIG. 5 in the form of the light source 510 comprising the corresponding condenser optics arrangement 515, for example comprising LEDs of different luminous colors. Unambiguous association of the individual light sources with groups of partial pictures and optical projection elements is then advantageously achieved by using a field lens array, as is shown in FIG. 6 by way of example. Omission of color filters here enables higher system transmission than in the suggested solution described above.

In further embodiments of the invention, the reflective image generator 120 and the projection optics arrangement 130 may be configured such that identical frames from different subareas are superimposed in a pixel-accurate manner.

In addition, the image generator 120, or the image-generator array, may be configured to display different frames. Said frames being imaged by the associated optical projection elements results in the overall picture, or projection picture.

Figure 11:
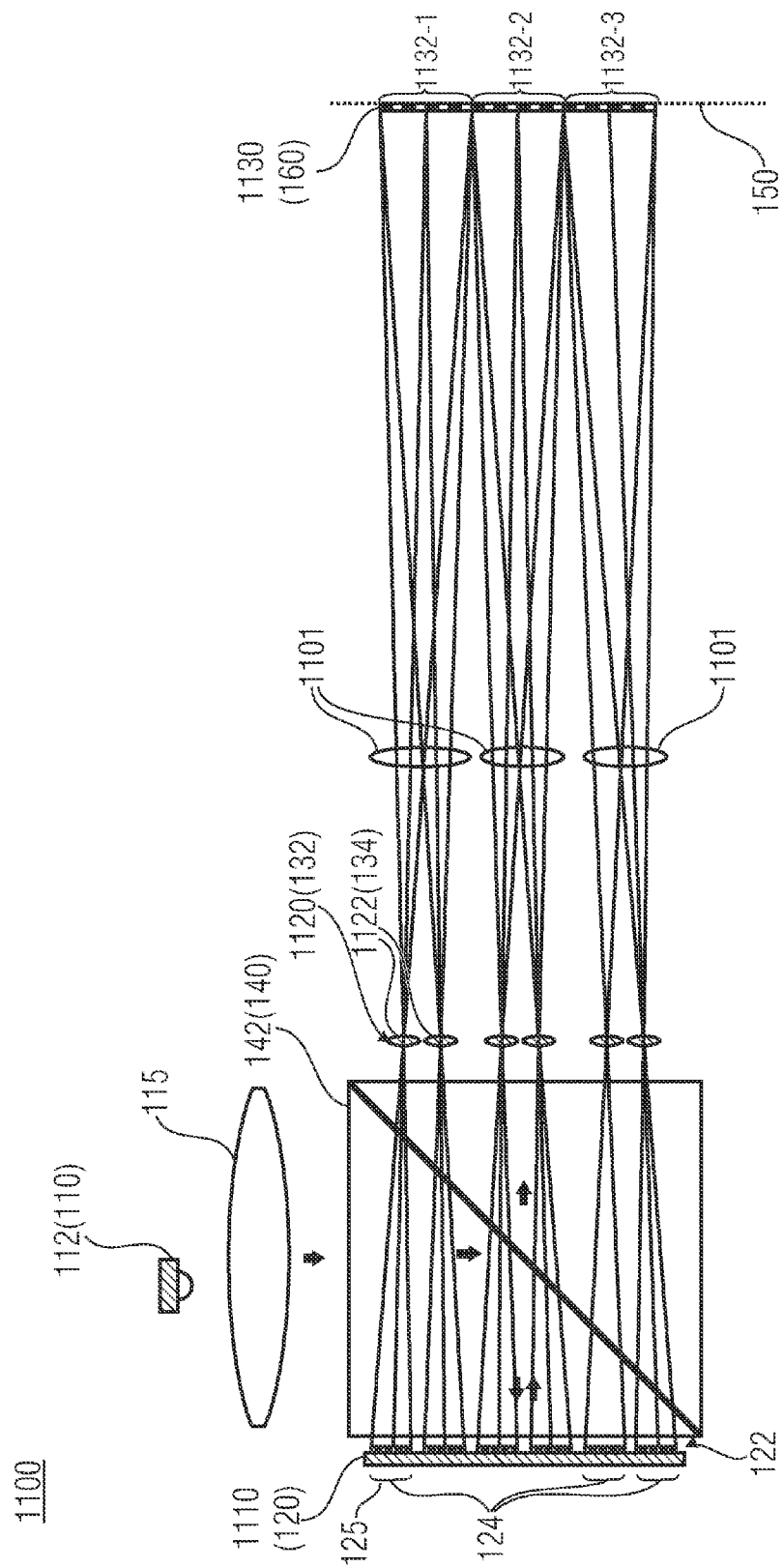
FIG. 11 shows a side view of an inventive projection display, wherein images of frames within an image plane superimpose one another to form an overall picture having a higher resolution.

FIG. 11 shows an inventive projection display 1100, wherein images of frames superimpose within an image plane 150 to form an overall picture 1130 having a higher resolution, or a higher number of pixels represented. In particular, in the embodiment shown in FIG. 11, the reflective image generator 1110 and the projection optics arrangement 1120 may be configured such that the images of the frames within the image plane 150 superimpose one another with a mutual subpixel offset. In this context, the optical projection elements 1122 in the two-dimensional arrangement 1120 have a decentration, depicted in FIG. 11 by way of example, with regard to the associated subareas 124. As is shown in FIG. 11 by way of example, this results in an overall picture 1130 superimposing within the image plane 150 and having a higher resolution, or higher pixel number represented, than the frames.

In addition to full-color projection, utilization of different partial pictures enables other realization variants. In particular, an enlargement of the resulting overall picture 1130, an increase in the number of pixels in the resulting overall picture, or both of them together, is/are enabled by joining together partial pictures, for example in accordance with FIG. 11. In the case depicted by way of example in FIG. 11, the overall picture 1130 is composed of three projected partial pictures 1132-1, 1132-2, 1132-3, said partial pictures being joined together and imaged via two projection channels 1101, respectively.

Figure 12:
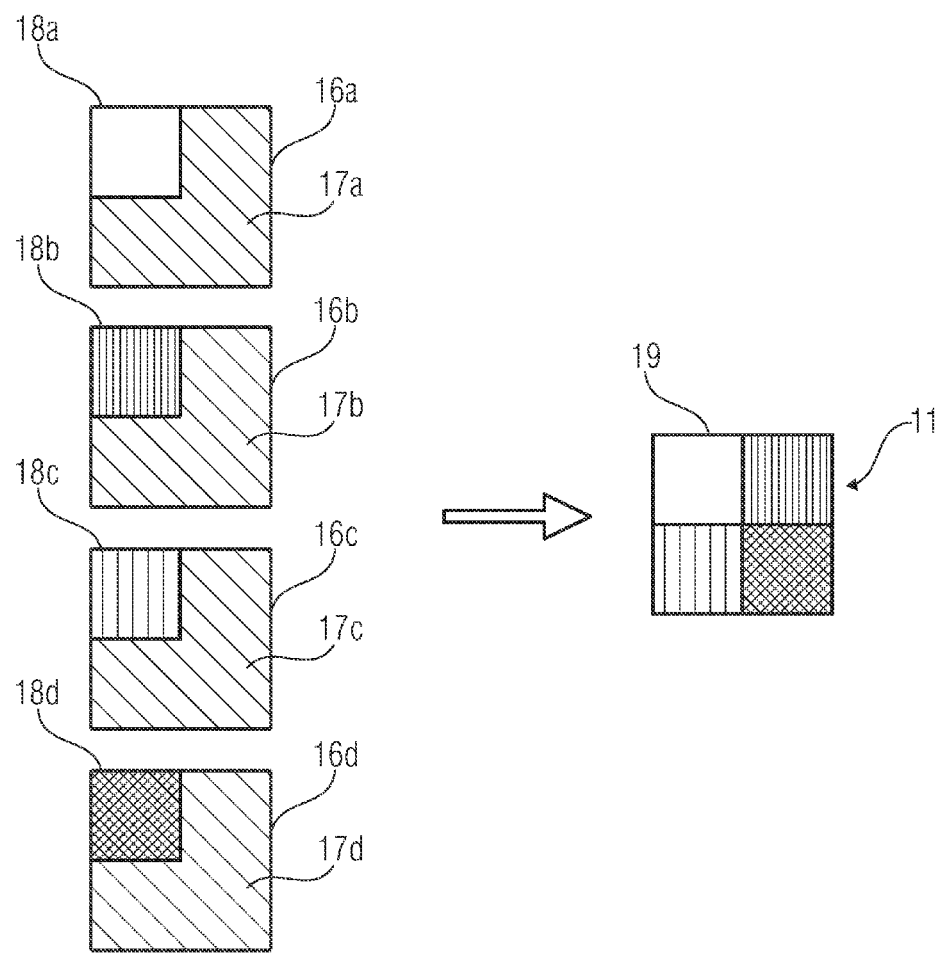
FIG. 12 shows a schematic representation for illustrating an inventive superposition of pixels to form an overall picture.

FIG. 12 shows a schematic representation for illustrating an inventive superposition 1200 of pixels for form an overall picture 19. The realization shown in FIG. 12 is advantageous in particular for image generators having low pixel fill factors. A pixel 16a, 16b, 16c or 16d of the image generator is generally composed of an inactive surface area 17a, 17b, 17c or 17d and an active area 18a, 18b, 18c or 18d. For the description which follows it shall be assumed that pixel 16a be white, 16b be light gray, pixel 16c be dark gray, and pixel 16d be black. If four groups (a, b, c, d) of projector channels are formed which contain pixels 16a, 16b, 16c or 16d in their partial pictures at the same positions in each case, which project the pixel subarea, or active area, 18a, 18b, 18c and 18d in a clearly resolved manner, and which have a decentration of the optical projection elements which enables projection that is offset by half a pixel pitch relative to the overall picture (subpixel offset), one will obtain—at the associated pixel position within the overall picture 19—a pixel pattern 11 which represents the superposition of the four partial pictures. Thus, the arrangement described enables a higher number of pixels in the overall picture, said pixel number being increased by the factor of 4 as compared to the partial pictures.

Figure 13:
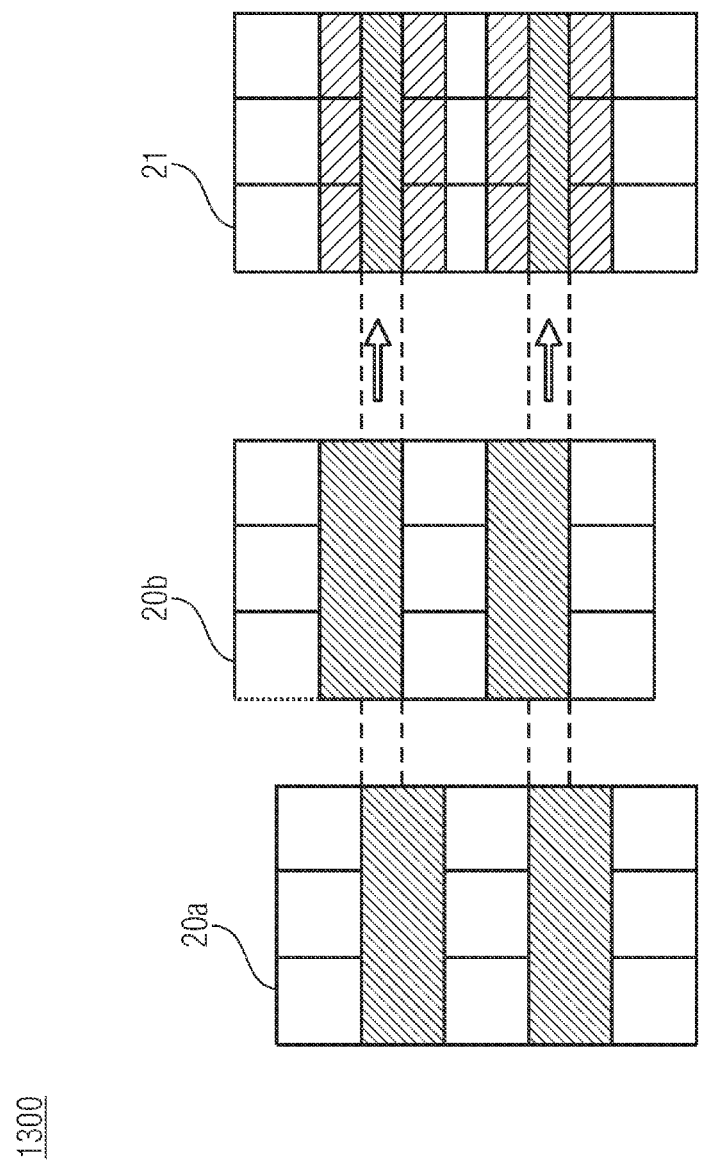
FIG. 13 shows a schematic representation for illustrating an inventive superposition of binary black and white partial pictures to form an overall picture.

FIG. 13 shows a schematic representation for illustrating an inventive superposition 1300 of binary black and white partial pictures to form an overall picture 21. If the image generator has a high fill factor, the superposition with a subpixel offset in the overall picture 21 results in a combination of an increased number of gray-scale values and an increase in the number of pixels that may be represented. In FIG. 13, this circumstance is represented using the example of a banded structure. The purely binary black and white partial pictures 20a, 20b superimpose each other to form an overall picture 21 having an increased number of gray scales and an increased number of pixels that may be represented.

Figure 14:
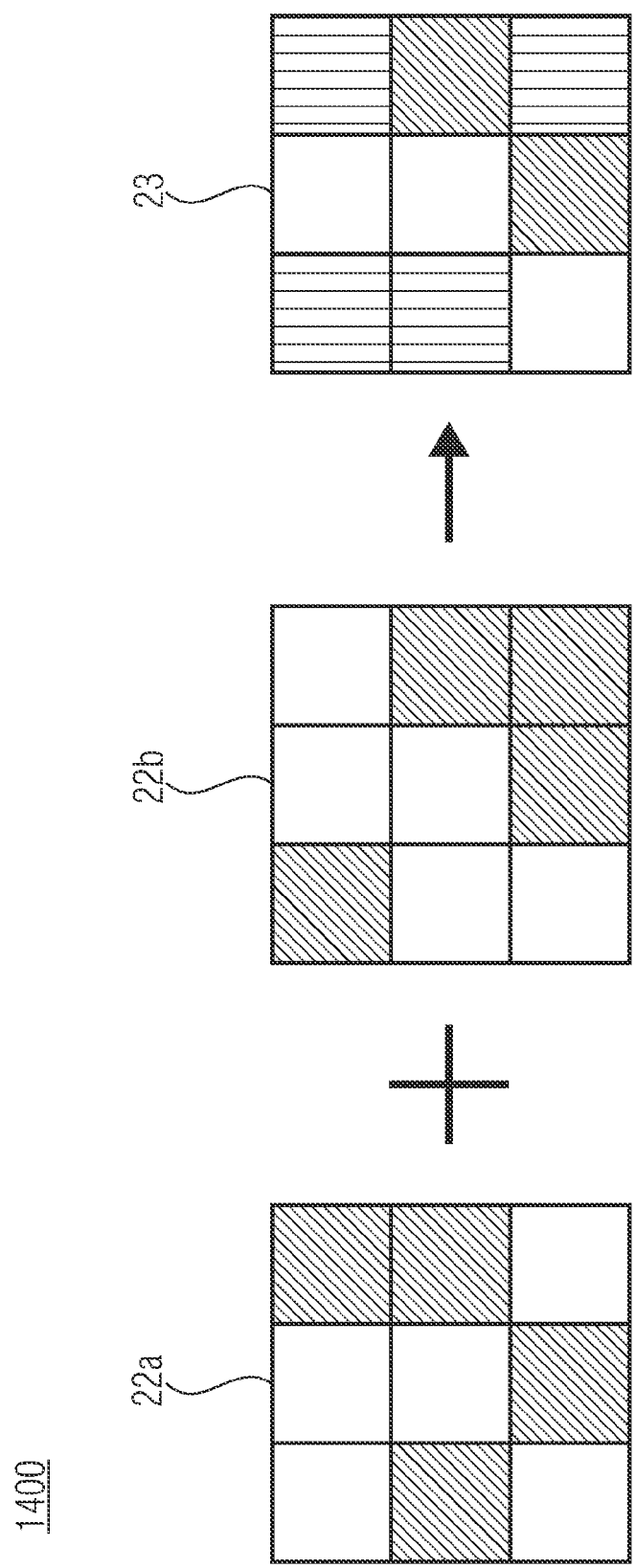
FIG. 14 shows a schematic representation for illustrating a further inventive superposition of binary black and white partial pictures to form an overall picture.

In addition to the increase in the pixel number, an increase in the number of the represented gray scales is possible without any picture misalignment. FIG. 14 shows a schematic representation for illustrating a further inventive superposition 1400 of binary black and white partial pictures to form an overall picture 23. By way of example, FIG. 14 depicts purely binary black and white partial pictures 22a, 22b, whose superposition to form the overall picture 23 already provides three gray scales. A further increase in the different binary pictures further increases the number of gray scales that may be represented. This approach to increasing the number of gray scales may also be used for non-purely binary pictures, but generally for partial pictures having few gray scales. Combining said approach with the above-described procedure of representing full-color pictures correspondingly enables an increase in the depth of color.

With regard to FIGS. 13, 14, the inventive projection display may thus be configured to receive a picture to be projected that has a first gray/color scale resolution, the reflective image generator 120 being configured to represent the frames (i.e. the binary black and white partial pictures 20a, 20b; 22a, 22b) with a second gray/color scale resolution smaller than the first gray/color scale resolution. In particular, the projection display may be configured to control the subareas—in dependence on a gray/color scale value of the projected image—at a picture point, or pixel, of the image to be projected, such that in the overall picture 21; 23, the frames will add up, at a location corresponding to the picture point, to yield a gray/color scale corresponding to the gray/color scale value.

Figure 15:
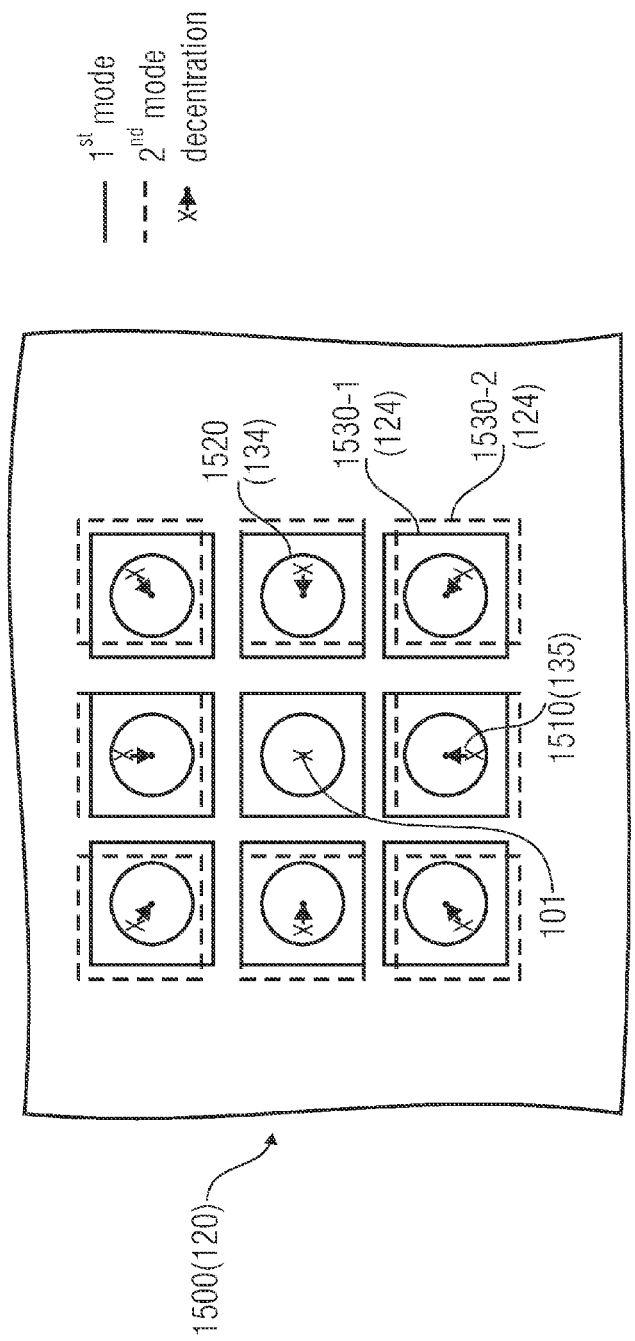
FIG. 15 shows a top view of an inventive reflective image generator having two different modes for different magnifications and/or different projection distances of an image.

FIG. 15 shows a top view of an inventive reflective image generator 1500 having two different modes for different magnifications and/or different projection distances of an image. In the embodiment shown in FIG. 15, the reflective image generator 1500, which essentially corresponds to the image generator 120 of the previous embodiments, comprises different modes for adjusting the distribution of subareas, so that from a first mode (continuous line) to a second mode (dashed line) of the image generator 1500, an extent of a decentration 1510 between the optical projection elements 1520 and the associated subareas 1530-1 in the first mode and/or 1530-2 in the second mode changes so as to achieve different magnifications and/or different projection distances in the first mode and in the second mode of the image generator 1500. In FIG. 15, the decentration 1510 is exemplarily depicted by vectors. The vectors correspond to the lateral offset, or to the central shifts, in the decentration between the subareas 1530-1, 1530-2 in the first and second modes, respectively, and the optical projection elements 1520. As is shown in FIG. 15, the decentration 1510 is adjusted, for example, such that in the first mode, the optical projection elements 1520 are centered in relation to the subareas 1530-1, whereas in the second mode, the optical projection elements 1520 are centrally contracted in relation to the subareas 1530-2 with regard to the central optical axis 101. In further embodiments, however, the decentration 1510 may also be adjusted such that in the second mode, the optical projection elements 1520 have a central dilation with regard to the central optical axis 101 in relation to the subareas 1530-2. In particular, a predefined projection distance may be adjusted in a variable manner by electronically adjusting the centration.

In particular, the image generator 1500 may also have a multitude of such modes which enable purely electronic focusing of the representation within a large range of projection distances.

In further embodiments of the invention, the first mode and the second mode of the image generator 1500 may also be adjusted in dependence on a projection distance measured. The projection distance may thus be effectively readjusted electronically. The projection distance may be measured using a proximity sensor for measuring the distance from the screen, which enables automatic focusing of the projector.

Figure 16:
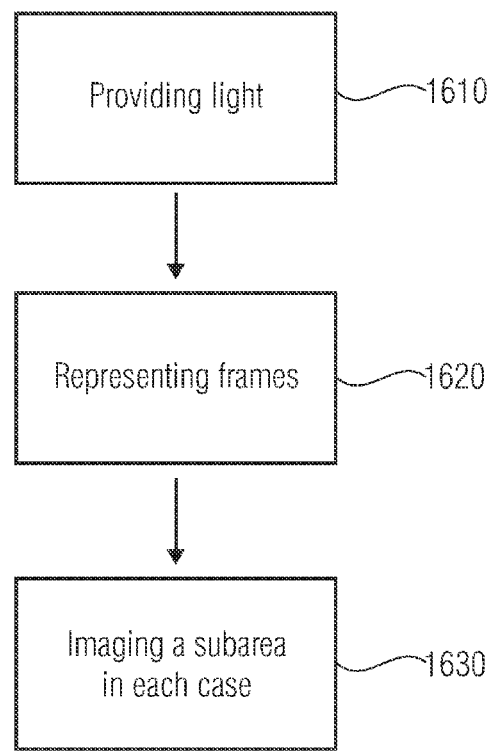
FIG. 16 shows a flowchart of a method of displaying an overall picture in accordance with embodiments of the present invention.

FIG. 16 shows a flowchart of a method 1600 for displaying an overall picture in accordance with embodiments of the present invention. The method 1600 comprises the following steps, for example. Initially, light is provided using a light source (step 1610). Subsequently, frames are represented in a two-dimensional distribution of subareas using a reflective image generator (step 1620). Finally, a subarea of the image generator is imaged onto an image plane, respectively, by a projection optics arrangement having a two-dimensional arrangement of optical projection elements, the subarea being associated with the optical projection elements in each case, so that images of the frames superimpose within the image plane to form an overall picture, a beam splitter being arranged within an optical path between the reflective image generator and the two-dimensional arrangement of optical projection elements, on the one hand, and the optical path between the light source and the reflective image generator, on the other hand (step 1630).

Embodiments of the present invention thus provide a projection display consisting of at least one light source, at least one reflective, digital image generator, for example on a liquid-crystal basis (LCoS), at least one, e.g. polarizing, beam splitter, and a regular arrangement of optical projection channels, for example in the form of one- or multi-layer optical elements. The individual projectors superimpose one another or compose their projection pictures to form a real picture on the screen, or to form a virtual picture in transmission.

An advantage of the present invention is that a technically complex correction of the imaging errors, in particular complex achromatization of the optical projection element, is not required. In addition, an inventive image generator has a high pixel error tolerance, which may result in lower manufacturing cost of image generators.

The present invention is also advantageous in that no mechanically moved lenses are necessitated for fine-focusing with changing projection distances.

Finally, in contrast to known projection systems, complex homogenization of the light source for illuminating the image generator may be avoided.

In summary, embodiments of the present invention provide an optical concept for realizing very flat and, at the same time, very bright projection systems, for example on the basis of a reflective liquid-crystal image generator. In contrast to hitherto customary single-channel projection systems based on reflective liquid-crystal image generators, such as LCoS, D-ILA (digital direct drive image light amplifier) or SXRD (silicon X-tal reflective display), the present arrangement overcomes direct dependence on system design length and transmissible luminous flux by using an optical multi-channel approach.

Feasible applications are in the fields of personal communication and consumer electronics as well as data visualization for home and for mobile use. A further field of application is in the automobiles and aircraft, in the form of a head-up display for projecting representation of color state information, navigation, environment information as driver assistance systems and/or for entertaining passengers. Also feasible are applications in measurement and medical technology as well as in display applications in industrial and manufacturing plants.

While this invention has been described in terms of several embodiments, there are alterations, permutations, and equivalents which fall within the scope of this invention. It should also be noted that there are many alternative ways of implementing the methods and compositions of the present invention. It is therefore intended that the following appended claims be interpreted as including all such alterations, permutations and equivalents as fall within the true spirit and scope of the present invention.

The invention claimed is:
1. A projection display comprising
a first light source,
at least one reflective image generator configured to represent frames in a two-dimensional distribution of subareas of the at least one reflective image generator, each frame comprising a plurality of pixels,
a projection optics arrangement comprising a two-dimensional arrangement of optical projection elements and being configured to image an associated subarea of the at least one reflective image generator onto an image plane in each case, so that images of the frames superimpose within the image plane to form an overall picture, and
a first beam splitter arranged within an optical path between the at least one reflective image generator and the two-dimensional arrangement of optical projection elements, and within an optical path between the first light source and the two-dimensional distribution of subareas, so that light of the first light source passes through the first beam splitter onto the two-dimensional distribution of subareas, and the projection of the two-dimensional distribution of subareas passes through the first beam splitter.
2. The projection display as claimed in claim 1, wherein the first beam splitter has a polarizing effect, and the at least one reflective image generator is configured to represent the frames in the form of an influence exerted on the polarization.

3. The projection display as claimed in claim 1, wherein the optical projection elements comprise decentration in relation to the associated subareas, wherein a center-to-center distance of the optical projection elements is smaller than a center-to-center distance of the associated subareas, so that the overall picture superimposing within the image plane is real.

4. The projection system as claimed in claim 1, wherein the optical projection elements comprise decentration with regard to the associated subareas, wherein the center-to-center distance of the optical projection elements is larger than or equal to the center-to-center distance of the associated subareas, so that the overall picture superimposing within the image plane is virtual.

5. The projection display as claimed in claim 1, wherein the optical projection elements are centered with regard to the associated subareas and have a collimating effect.

6. The projection display as claimed in claim 1, wherein the projection optics arrangement further comprises an overall lens connected downstream from the two-dimensional arrangement of optical projection elements and cooperating with the two-dimensional arrangement of optical projection elements, said overall lens being configured to refocus collimated beams from the optical projection elements, so that the image plane of the overall picture is located within a focal plane of the overall lens, the optical projection elements being centered with regard to the associated subareas and having a collimating effect.

7. The projection display as claimed in claim 6, wherein the overall lens is configured as optics comprising variable focal length, so that a projection distance is adjustable.

8. The projection display as claimed in claim 7, wherein the optics comprising variable focal length is a zoom objective or a fluid lens.

9. The projection display as claimed in claim 1, wherein each optical projection element comprises a lens vertex decentered toward the aperture of the respective optical projection element, a center-to-center distance of the lens vertices being larger or smaller than the center-to-center distance of the associated subareas, so that the lenses effect the frame of the respective subarea to be projected onto the image plane, where the images of the frames will superimpose to form the overall picture.

10. The projection display as claimed in claim 1, wherein at least within an optical path between the at least one reflective image generator and the first beam splitter, a two-dimensional arrangement of field lenses associated with the optical projection elements is arranged so that a Köhler illumination of each optical projection element of the two-dimensional arrangement of optical projection elements is achieved.

11. The projection display as claimed in claim 10, wherein a focal length of the field lenses is between 1.5 and 2.5 times a focal length of the optical projection elements.

12. The projection display as claimed in claim 1, further comprising:
a second beam splitter; wherein
the at least one reflective image generator is configured to represent further frames in a further two-dimensional distribution of further subareas of the at least one reflective image generator, and the projection optics arrangement comprises a further two-dimensional arrangement of further optical elements,
the second beam splitter is arranged between the at least one reflective image generator and the further two-dimensional arrangement of optical projection elements, and within the optical path between the first light source and the further two-dimensional distribution of further subareas, so that light of the first light source passes through the first and second beam splitter onto the further two-dimensional distribution of further subareas, and the projection of the further two-dimensional distribution of further subareas passes through the second beam splitter, and
a half-wave plate arranged between the first beam splitter and the second beam splitter so that a polarization direction of a polarization component, transmitted through the first beam splitter, of light emitted by the first light source is rotated by 90° during passing of the half-wave plate, the first beam splitter and the second beam splitter being configured to reflect light, which comes from a direction of the first light source and comprises the polarization direction that is rotated by 90°, in a direction of the at least one reflective image generator.

13. The projection display as claimed in claim 1, further comprising:
a second light source; and
a second beam splitter; wherein
the at least one reflective image generator is configured to represent further frames in a further two-dimensional distribution of further subareas of the at least one reflective image generator, and the projection optics arrangement comprises a further two-dimensional arrangement of further optical projection elements, and
the second beam splitter is arranged between the at least one reflective image generator and the further two-dimensional arrangement of further optical projection elements, the second beam splitter being arranged within the optical path between the second light source and the further two-dimensional distribution of further subareas of the at least one reflective image generator, and the second beam splitter being arranged within the optical path between the second light source and the second set of subareas of the at least one reflective image generator, so that light of the second light source passes through the second beam splitter onto the further two-dimensional distribution of further subareas, and the projection of the further two-dimensional distribution of further subareas passes through the second beam splitter.

14. The projection display as claimed in claim 13, wherein projection of outer edges of the first and second beam splitters on the at least one reflective image generator arises such that it does not pass through the subareas of the at least one reflective image generator.

15. The projection display as claimed in claim 1, wherein the at least one reflective image generator is configured to represent the frames with a sufficiently high frame rate, and wherein the first light source is configured to sequentially pass through different components per frame.

16. The projection display as claimed in claim 1, wherein the first light source, the first beam splitter, the projection optics arrangement, and the at least one reflective image generator are configured such that reflected light from at least two subareas of the image generator comprises an identical color spectrum.

17. The projection display as claimed in claim 1, wherein the first light source is arranged such that different subareas of the at least one reflective image generator are illuminated with different color components.

18. The projection display as claimed in claim 1, wherein the at least one reflective image generator is configured to represent groups of frames, each of which represents a grayscale value of a color component of a picture content, each group of frames comprising color filters associated with it, so that the groups of frames are filtered in accordance with the respective color component so that the overall picture superimposing within the image plane represents a color mixture.

19. The projection display as claimed in claim 1, wherein the at least one reflective image generator and the projection optics arrangement are configured such that identical frames from different subareas are superimposed in a pixel-accurate manner.

20. The projection display as claimed in claim 1, configured to receive a picture to be projected that comprises a first gray or color scale resolution, the at least one reflective image generator being configured to represent the frames with a second gray or color scale resolution smaller than the first gray or color scale resolution, the projection display being configured to control the subareas, in dependence on a gray or color scale value of the projected image, at a picture point of the image to be projected, such that in the overall picture, the frames will add up, at a location corresponding to the picture point, to yield a gray or color scale corresponding to the gray or color scale value.

21. The projection display as claimed in claim 1, wherein the reflective image generator and the projection optics arrangement are configured such that the images of the frames within the image plane superimpose one another with a mutual subpixel offset, the optical projection elements comprising a decentration with regard to the associated subareas, so that the overall picture superimposing within the image plane comprises a higher resolution than the frames.

22. The projection display as claimed in claim 1, wherein the reflective image generator comprises different modes for adjusting the distribution of subareas, so that from a first mode to a second mode of the image generator, an extent of a decentration between the optical projection elements and the associated subareas changes so as to achieve different projection distances or different magnifications in the first mode and in the second mode of the image generator.

23. The projection display as claimed in claim 22, wherein the first mode and the second mode of the at least one reflective image generator are adjustable as a function of a projection distance measured.

24. The projection display as claimed in claim 1, wherein the first beam splitter is made of a dispersive material, and wherein different groups of subareas contribute to the overall picture with different color spectra, wherein within the two-dimensional arrangement of optical projection elements, optical projection elements which image subareas that contribute to the overall picture with mutually different color spectra are arranged at an identical geometric distance from the at least one reflective image generator, but differ from one another in terms of their focal lengths in order to balance different optical path lengths between the at least one reflective image generator and the optical projection elements for the respective color spectrum.

25. The projection display as claimed in claim 1, wherein the first beam splitter is made of a dispersive material, and wherein different groups of subareas contribute to the overall picture with different color spectra, wherein within the two-dimensional arrangement of optical projection elements, optical projection elements which image subareas that contribute to the overall picture with mutually different color spectra comprise identical focal lengths, but are arranged in mutually different geometric distances from the at least one reflective image generator in order to adapt optical path lengths between the at least one reflective image generator and the optical projection elements for the respective color spectrum.

26. The projection display as claimed in claim 1, wherein different groups of subareas contribute to the overall picture with different color spectra, wherein the at least one reflective image generator is configured such that a size of subareas contributing to the overall picture with a first one of the different color spectra is different from a size of subareas contributing to the overall picture with a second color spectrum differing from the first different one of the different color spectra, so that sizes of the frames are matched to one another within the image plane.

27. The projection display as claimed in claim 1, wherein in the two-dimensional arrangement of optical projection elements, the optical projection elements are corrected in terms of defocusing or astigmatism or coma that increases as the distance from an optical axis of the at least one reflective image generator and the projection optics arrangement increases.

28. The projection display as claimed in claim 27, wherein the at least one reflective image generator is configured such that a size of the subareas continuously changes as the distance from the optical axis of the at least one reflective image generator and the projection optics arrangement increases, so that the frames within the image plane are equally sized.

29. A method of displaying an overall picture, comprising:
providing light using at least one light source;
representing frames in a two-dimensional distribution of subareas of at least one reflective image generator, each frame comprising a plurality of pixels, using the at least one reflective image generator;
imaging a subarea of the at least one reflective image generator onto an image plane by a projection optics arrangement comprising a two-dimensional arrangement of optical projection elements, said subarea being associated with the optical projection elements in each case, so that images of the frames superimpose within the image plane to form an overall picture,
arranging a first beam splitter within an optical path between the at least one reflective image generator and the two-dimensional arrangement of optical projection elements, and the optical path between the at least one light source and the two-dimensional distribution of subareas, so that light of each of the at least one light source passes through the first beam splitter onto the two-dimensional distribution of subareas, and the projection of the two-dimensional distribution of subareas passes through the first beam splitter.

30. A projection display comprising
at least one light source,
at least one reflective image generator configured to represent frames in a two-dimensional distribution of subareas of the at least one reflective image generator, each frame comprising a plurality of pixels,
a projection optics arrangement comprising a two-dimensional arrangement of optical projection elements and being configured to image an associated subarea of the at least one reflective image generator onto an image plane in each case, so that images of the frames superimpose within the image plane to form an overall picture, and
at least one beam splitter arranged within an optical path between the at least one reflective image generator and the two-dimensional arrangement of optical projection elements, and within an optical path between the at least one light source and the two-dimensional distribution of subareas, so that light of the at least one light source passes through the at least one beam splitter onto the two-dimensional distribution of subareas, and the projection of the two-dimensional distribution of subareas passes through the at least one beam splitter; wherein the optical projection elements comprise decentration in relation to the associated subareas, wherein a center-to-center distance of the optical projection elements is smaller than a center-to-center distance of the associated subareas, so that the overall picture superimposing within the image plane is real.

31. A projection display comprising:

at least one light source, at least one reflective image generator configured to represent frames in a two-dimensional distribution of subareas of the at least one reflective image generator, each frame comprising a plurality of pixels, a projection optics arrangement comprising a two-dimensional arrangement of optical projection elements and being configured to image an associated subarea of the at least one reflective image generator onto an image plane in each case, so that images of the frames superimpose within the image plane to form an overall picture, and at least one beam splitter arranged within an optical path between the at least one reflective image generator and the two-dimensional arrangement of optical projection elements, and within an optical path between the at least one light source and the two-dimensional distribution of subareas, so that light of the at least one light source passes through the at least one beam splitter onto the two-dimensional distribution of subareas, and the projection of the two-dimensional distribution of subareas passes through the at least one beam splitter;

the optical projection elements comprise decentration with regard to the associated subareas, wherein the center-to-center distance of the optical projection elements is larger than or equal to the center-to-center distance of the associated subareas, so that the overall picture superimposing within the image plane is virtual.

32. A projection display comprising at least one light source, at least one reflective image generator configured to represent frames in a two-dimensional distribution of subareas of the at least one reflective image generator, each frame comprising a plurality of pixels, a projection optics arrangement comprising a two-dimensional arrangement of optical projection elements and being configured to image an associated subarea of the at least one reflective image generator onto an image plane in each case, so that images of the frames superimpose within the image plane to form an overall picture, and at least one beam splitter arranged within an optical path between the at least one reflective image generator and the two-dimensional arrangement of optical projection elements, and within an optical path between the at least one light source and the two-dimensional distribution of subareas, so that light of the at least one light source passes through the at least one beam splitter onto the two-dimensional distribution of subareas, and the projection of the two-dimensional distribution of subareas passes through the at least one beam splitter; wherein the optical projection elements are centered with regard to the associated subareas and have a collimating effect.

* * * * *